US012254545B2

(12) United States Patent
Park et al.

(10) Patent No.: US 12,254,545 B2
(45) Date of Patent: *Mar. 18, 2025

(54) GENERATING MODIFIED DIGITAL IMAGES INCORPORATING SCENE LAYOUT UTILIZING A SWAPPING AUTOENCODER

(71) Applicant: Adobe Inc., San Jose, CA (US)

(72) Inventors: Taesung Park, Albany, CA (US); Alexei A Efros, Berkeley, CA (US); Elya Shechtman, Seattle, WA (US); Richard Zhang, San Francisco, CA (US); Junyan Zhu, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/298,138

(22) Filed: Apr. 10, 2023

(65) Prior Publication Data

US 2023/0245363 A1    Aug. 3, 2023

Related U.S. Application Data

(63) Continuation of application No. 17/091,416, filed on Nov. 6, 2020, now Pat. No. 11,625,875.

(51) Int. Cl.
*G06T 11/60* (2006.01)
*G06N 3/045* (2023.01)
(Continued)

(52) U.S. Cl.
CPC .............. *G06T 11/60* (2013.01); *G06N 3/045* (2023.01); *G06N 3/088* (2013.01); *G06T 7/10* (2017.01)

(58) Field of Classification Search
CPC .............. G06T 11/60; G06T 7/10; G06K 9/46
See application file for complete search history.

(56) References Cited

U.S. PATENT DOCUMENTS 4,706,243 A    11/1987    Noguchi
10,658,005 B1    5/2020    Bogan, III et al.
(Continued)

OTHER PUBLICATIONS

H. Caesar, J. Uijlings, and V. Ferrari. Coco-stuff: Thing and stuff classes in context. In Proceedings of the IEEE Conference on Computer Vision and Pattern Recognition, pp. 1209-1218, 2018.
(Continued)

*Primary Examiner* — Yi Yang
(74) *Attorney, Agent, or Firm* — Keller Preece PLLC

(57) ABSTRACT

The present disclosure relates to systems, methods, and non-transitory computer readable media for accurately and flexibly generating modified digital images utilizing a novel swapping autoencoder that incorporates scene layout. In particular, the disclosed systems can receive a scene layout map that indicates or defines locations for displaying specific digital content within a digital image. In addition, the disclosed systems can utilize the scene layout map to guide combining portions of digital image latent code to generate a modified digital image with a particular textural appearance and a particular geometric structure defined by the scene layout map. Additionally, the disclosed systems can utilize a scene layout map that defines a portion of a digital image to modify by, for instance, adding new digital content to the digital image, and can generate a modified digital image depicting the new digital content.

20 Claims, 13 Drawing Sheets

(51) Int. Cl.
*G06N 3/088* (2023.01)
*G06T 7/10* (2017.01)

(56) References Cited

U.S. PATENT DOCUMENTS

| | | | |
|---|---|---|---|
| 2010/0202699 | A1 | 8/2010 | Matsuzaka et al. |
| 2013/0265382 | A1 | 10/2013 | Guleryuz et al. |
| 2016/0125572 | A1* | 5/2016 | Yoo .......................... G06T 5/70 382/157 |
| 2016/0350930 | A1 | 12/2016 | Lin et al. |
| 2019/0355103 | A1* | 11/2019 | Baek ........................ G06T 5/60 |

OTHER PUBLICATIONS

L.-C. Chen, G. Papandreou, I. Kokkinos, K. Murphy, and A. L. Yuille. Deeplab: Semantic image segmentation with deep convolutional nets, atrous convolution, and fully connected crfs. IEEE transactions on pattern analysis and machine intelligence, 40(4):834-848, 2017.
I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.
P. Isola, J.-Y. Zhu, T. Zhou, and A. A. Efros. Image-to-image translation with conditional adversarial networks. In Proceedings of IEEE Conference on Computer Vision and Pattern Recognition (CVPR), 2017.
T. Park, M.-Y. Liu, T.-C. Wang, and J.-Y. Zhu. Semantic image synthesis with spatially-adaptive normalization. In Proceedings of IEEE Conference on Computer Vision and Pattern Recognition (CVPR), 2019.
T. Park, J.-Y. Zhu, O. Wang, J. Lu, E. Shechtman, A. A. Efros, and R. Zhang. Swapping autoencoder for deep image manipulation. In ArXiv, 2020.
T.-C.Wang, M.-Y. Liu, J.-Y. Zhu, A. Tao, J. Kautz, and B.Catanzaro. High-resolution image synthesis and semantic manipulation with conditional gans. In Proceedings of IEEE Conference on Computer Vision and Pattern Recognition (CVPR), 2018.
U.S. Appl. No. 17/091,416, filed Dec. 17, 2021, Office Action.
U.S. Appl. No. 17/091,416, filed Mar. 21, 2022, Office Action.
U.S. Appl. No. 17/091,416, filed Aug. 26, 2022, Office Action.
U.S. Appl. No. 17/091,416, filed Dec. 20, 2022, Notice of Allowance.

* cited by examiner

GENERATING MODIFIED DIGITAL IMAGES INCORPORATING SCENE LAYOUT UTILIZING A SWAPPING AUTOENCODER

CROSS-REFERENCE TO RELATED APPLICATIONS

The present application is a continuation of U.S. application Ser. No. 17/091,416, filed on Nov. 6, 2020. The aforementioned application is hereby incorporated by reference in its entirety.

BACKGROUND

In the field of digital image editing, deep generative models have become increasingly effective at producing realistic images from randomly sampled seeds. These models, such as generative adversarial networks ("GANs"), have revolutionized digital image synthesis, enabling photorealistic rendering of complex phenomena such as faces and other object categories. Other models utilize deep neural networks to generate output digital images from input digital images by extracting and combining deep features of digital images. Despite the advances of conventional digital image editing systems that utilize these models, however, these conventional systems continue to suffer from a number of disadvantages, particularly in their inflexibility when applied to editing real images.

As just suggested, many conventional digital image editing systems generate digital images that inaccurately depict digital content. For example, to generate an output digital image, some conventional digital image editing systems utilize neural networks based purely on unlabeled datasets. As a result, these conventional systems learn representations that are entirely disconnected from semantics of digital content displayed in the digital images—e.g., a scene layout. Indeed, many conventional digital image editing systems lack control over which visual digital content boundaries should be maintained and which should be allowed to change. Due at least in part to their lack of semantic consideration, conventional digital image editing systems often generate digital images with inaccurate representations of digital content by, for example, placing certain digital content (e.g., a tree) in inaccurate, unrealistic, or otherwise undesirable locations (e.g., on a lake).

In addition to generating digital images with inaccurate placement of digital content, many conventional digital image editing systems are further inflexible. Particularly, conventional systems often limit generation of output digital images to replication and/or rearrangement of digital content already found within input digital images. Indeed, these conventional systems cannot flexibly adapt to modify portions of digital images to add new digital content not already found within the digital images. While some conventional digital image editing systems can add digital content to a given digital image, these systems nevertheless rigidly require access to another reference digital image from which to extract the digital content to add to the given digital image.

Thus, there are several disadvantages with regard to conventional digital image editing systems.

SUMMARY

One or more embodiments described herein provide benefits and solve one or more of the foregoing or other problems in the art with systems, methods, and non-transitory computer readable media that accurately and flexibly generate modified digital images utilizing a novel swapping autoencoder that incorporates scene layout. In particular embodiments, the disclosed systems receive a scene layout map that indicates or defines locations for displaying specific digital content within a digital image. The disclosed systems utilize the scene layout map to guide combining portions of digital image latent code to generate a modified digital image with a particular textural appearance and a particular geometric structure defined by the scene layout map. For example, the disclosed systems utilize a swapping autoencoder to split latent code of the digital image into two separate components: 1) a structure code that represents a geometric structure of the digital image, and 2) a texture code that represents the textural appearance of the digital image. Further, in certain embodiments, the disclosed systems combine a given structure code and a given texture code in accordance with a scene layout map to generate a modified digital image. In some embodiments, the disclosed systems utilize a scene layout map that defines a portion of a digital image to modify (e.g., by adding new digital content not found in the input digital image) and generate a modified digital image with the modified portion.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
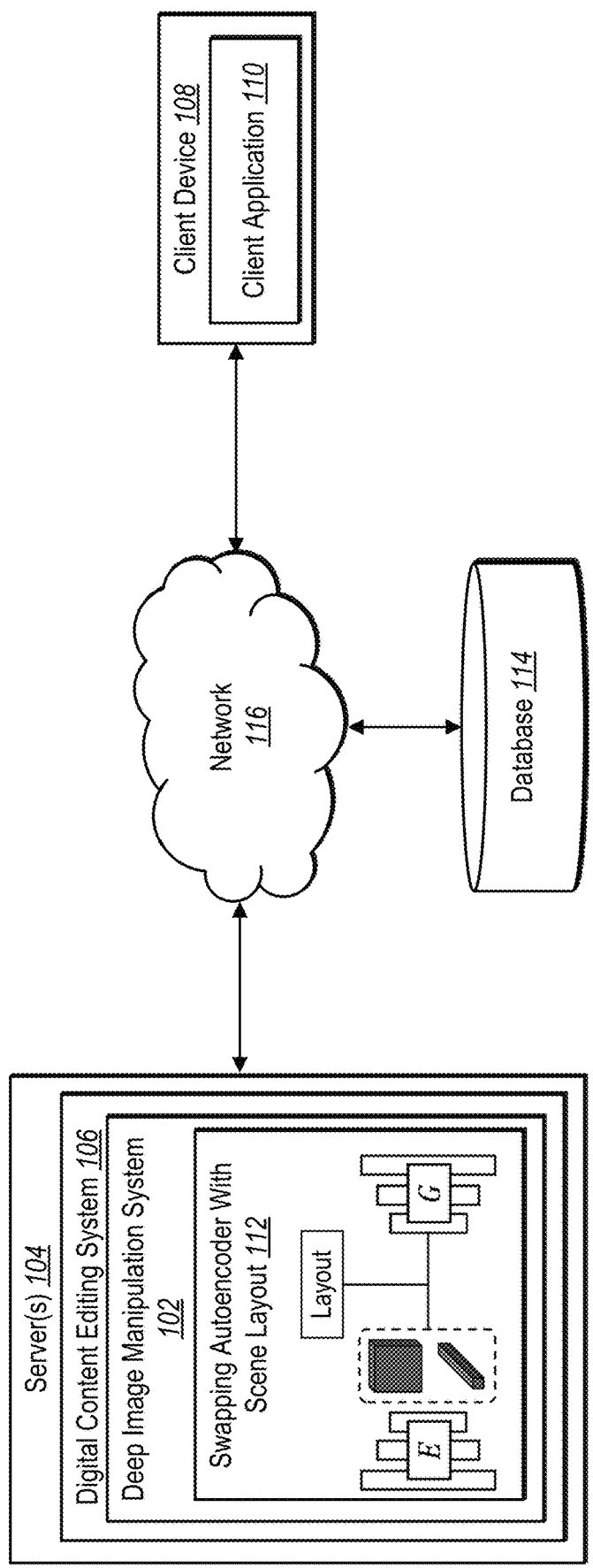
FIG. 1 illustrates an example system environment in which a deep image manipulation system operates in accordance with one or more embodiments.

One or more embodiments described herein include a deep image manipulation system that accurately and flexibly generates modified digital images utilizing a swapping autoencoder to extract and combine structure codes and texture codes in accordance with scene layout maps. In certain embodiments, the deep image manipulation system incorporates semantic information into the swapping autoencoder by enforcing the generator neural network to respect boundaries of class labels indicated by scene layout maps. As a result, in some embodiments, the deep image manipulation system changes style of a digital image while respecting a scene layout. In these or other embodiments, the deep image manipulation system also performs layout-based editing of digital images, such as inserting digital content (e.g., a pond) into an input digital image that included no such digital content and without accessing a reference digital image that contains the digital content.

As mentioned, in embodiments described herein, the deep image manipulation system utilizes a scene layout map. For example, the deep image manipulation system receives a scene layout map indicating or defining locations for digital content depicted within a digital image. In one or more embodiments, the deep image manipulation system receives a scene layout map that indicates boundaries for differently labeled digital content. For instance, the scene layout map indicates or defines where digital content labeled as "trees" are located in the digital image versus locations of labeled "water" or "sky". In some cases, the deep image manipulation system receives a scene layout map indicating a region of a digital image to be modified. For instance, the scene layout map defines a region for replacing existing digital content (e.g., "ground") with new digital content not found in the input digital image (e.g., "water").

As also mentioned, in certain described embodiments, the deep image manipulation system extracts a structure code from a digital image. For example, the deep image manipulation system utilizes an encoder neural network (e.g., as part of a swapping autoencoder) to extract a structure code from an input digital image. Specifically, in some cases, the deep image manipulation system extracts a structure code by extracting features from the input digital image that indicate a geometric structure or a structure arrangement of digital content depicted within the input digital image. Indeed, to extract a structure code, in some embodiments, the deep image manipulation system utilizes the encoder neural network to map the input digital image to a latent feature space where disentangled factors emerge within individual elements of the latent code.

In the same or other embodiments, the deep image manipulation system extracts a texture code from a digital image. For example, the deep image manipulation system extracts a texture code from the same digital image associated with the structure code or from a different digital image.

In some cases, the deep image manipulation system extracts a texture code by extracting features from the digital image that indicate a textural appearance or an overall aesthetic (e.g., style) of the digital image. Similar to extracting a structure code, to extract a texture code, in some embodiments, the deep image manipulation system utilizes the encoder neural network to map the input digital image to a latent feature space where disentangled factors emerge within individual elements of the latent code.

In certain embodiments, the deep image manipulation system extracts a first structure code and a first texture code from a first digital image and further extracts a second structure code and a second texture code from a second digital image. In addition, in some cases, the deep image manipulation system receives a scene layout map that defines locations for depicting digital content within the first digital image or the second digital image. The deep image manipulation system further generates a modified digital image by utilizing a generator neural network (e.g., as part of the swapping autoencoder) to combine a texture code from one digital image with a structure code from another digital image according to the scene layout map. For instance, the deep image manipulation system combines either i) the first structure code and the second texture code in accordance with the scene layout map from the first digital image, or ii) the first texture code and the second structure code in accordance with the scene layout map from the second digital image. By combining a structure code and a texture code according to the scene layout map of the digital image corresponding to the structure code, in one or more embodiments, the deep image manipulation system generates a modified digital image that depicts digital content structurally arranged as indicated by the scene layout map.

To elaborate, in some embodiments, the deep image manipulation system forces the depicted digital content to fit the boundaries indicated by the scene layout map. In some conventional systems, structure code indicates locations of semantic boundaries. However, given the same structure code and different texture codes, the deep image manipulation system generates digital content that sometimes deviates from semantic boundaries (e.g., a mountain may move slightly up or slightly down). Indeed, the deep image manipulation system is able to follow the guidance of a scene layout map (e.g., indicating regions with the same labels) to more precisely align digital content of particular labels with corresponding locations or regions of the scene layout map. When the deep image manipulation system combines the first structure code (from the first digital image) with the second texture code (from the second digital image), for instance, the deep image manipulation system modifies the first structure code so that the structural arrangement of the depicted digital content fits the boundaries of the scene layout map. For example, the deep image manipulation system replaces features of the first structure code such that the features within regions of the scene layout map with the same label are consistent.

To generate the scene layout map, in certain described embodiments, the deep image manipulation system utilizes a semantic segmentation neural network. For instance, the deep image manipulation system utilizes a semantic segmentation neural network to extract the scene layout map from a reference digital image. In some cases, the deep image manipulation system receives the reference digital image via user interaction selecting the reference digital image. In these or other cases, the deep image manipulation system further applies the semantic segmentation neural network to extract or generate the scene layout map from the layout or the arrangement of digital content within the reference digital image.

As mentioned above, in certain embodiments, the deep image manipulation system generates a modified digital image by adding digital content not initially present in the input digital image. For example, the deep image manipulation system receives a scene layout map indicating a region of the input digital image to be modified (e.g., a region for adding the new digital content). In some embodiments, the deep image manipulation system generates the modified digital image by replacing structure code of the indicated region with new structure code, or by otherwise modifying the structure code. For example, the deep image manipulation system modifies an indicated region of a single input digital image while preserving the remaining portions or regions of the input digital image. As another example, the deep image manipulation system modifies an indicated region of a first digital image while also combining other features (e.g., a texture code) with a second digital image.

To replace an indicated portion of an input digital image, in one or more embodiments, the deep image manipulation system determines structure codes for corresponding portions of one or more additional digital images. For instance, the deep image manipulation system utilizes an encoder neural network to extract structure codes from additional digital images and further determines representative (e.g., average) structure codes for portions the additional digital images corresponding to the indicated region. In some cases, the deep image manipulation system generates clusters of structure codes from the portions of digital images corresponding to the indicated region and selects representative (e.g., average) structure codes from the clusters to generate a set of possible structure codes from which to select for including within the structure code of the input digital image. Thus, in certain embodiments, the deep image manipulation system selects a representative structure code and replaces the portion of the structure code of the input digital image that corresponds to the indicated region with the representative structure code.

As suggested above, embodiments of the deep image manipulation system provide several advantages over conventional digital image search systems. For example, compared to conventional systems, certain embodiments of the deep image manipulation system generate digital images that more accurately arrange, or place depicted digital content. While many conventional systems utilize models based purely on unlabeled datasets and cannot therefore account for semantic considerations, the deep image manipulation system utilizes a swapping autoencoder that incorporates a scene layout map to generate modified digital images while enforcing semantic boundaries. Thus, unlike some conventional systems that generate digital images with digital content that crosses, or is otherwise placed outside of, its semantic boundary, the deep image manipulation system generates modified digital images with enforced semantic boundaries for a more accurate and realistic result (e.g., by preventing a tree from being placed on a lake).

As suggested above, embodiments of the deep image manipulation system further provide improved flexibility over conventional digital image search systems. Indeed, unlike many conventional systems that are limited to generating digital images depicting only digital content already depicted within an input digital image (or some other reference digital image), the deep image manipulation system flexibly adapts to incorporate new digital content within an output digital that is not depicted within an input digital image. For example, the deep image manipulation system utilizes a swapping autoencoder to incorporate a scene layout map that indicates a portion of structure code of an input digital image to replace with structure code for new digital content.

As an additional example of improved flexibility, the deep image manipulation system provides increased and individualized control over semantic boundaries. Indeed, some conventional systems are based purely on unlabeled data and therefore cannot control semantic boundaries for digital content of different labels, resulting in unpredictable and uncontrollable output. By utilizing a scene layout map (e.g., received via user selection) to guide combining structure code and style code, the deep image manipulation system provides increased and individualized control over which boundaries are fixed and which are allowed to change in generating a modified digital image.

As suggested by the foregoing discussion, this disclosure utilizes a variety of terms to describe features and benefits of the deep image manipulation system. Additional detail is hereafter provided regarding the meaning of these terms as used in this disclosure. In particular, the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., determinations of digital image classes or labels) based on a plurality of inputs provided to the neural network. In some cases, a neural network refers to an algorithm (or set of algorithms) that implements deep learning techniques to model high-level abstractions in data.

Relatedly, an "encoder neural network" refers to a neural network that, as part of a swapping autoencoder, extracts features from a digital image. For example, an encoder neural network extracts latent code from a digital image, including a structure code and a texture code. In some embodiments, an encoder neural network includes residual blocks that refer to blocks within a main branch of layers of the encoder neural network and that are utilized to generate a texture code. In these or other embodiments, an encoder neural network includes layout blocks that refer to blocks not within the main branch of the encoder neural network and that are utilized to analyze intermediate (e.g., non-output) features to generate a structure code.

Additionally, the term "generator neural network" refers to a neural network that, as part of a swapping autoencoder, generates a modified digital image by combining structure codes and texture codes, along with a scene layout. For example, a generator neural network generates a modified digital image by combining a structure code from one digital image with a texture code from another digital image (or the same digital image), along with a scene layout. In some embodiments, the generator neural network and the encoder neural network are part of a swapping autoencoder. As used herein, the term "swapping autoencoder" refers to a neural network, or a combination of neural networks, that extracts and combines latent codes for digital images to generate modified digital images with varied appearance. For example, the swapping autoencoder includes an encoder neural network and a generator neural network for combining the geometric structure of one digital image with the textural appearance or style of another digital image. While learning parameters of the swapping autoencoder (e.g., parameters of the encoder neural network and the generator neural network), the swapping autoencoder also includes a discriminator neural network for adversarial parameter learning.

As mentioned above, in certain embodiments, the deep image manipulation system utilizes a semantic segmentation neural network to generate or extract a scene layout map. As used herein, the term "semantic segmentation neural network" refers to a neural network that extracts or generates a scene layout map from a reference digital image. For example, a semantic segmentation neural network includes a neural network that processes one or more reference digital images to identify locations (or regions) and boundaries of digital content depicted within the reference digital image(s). In some cases, a semantic neural network determines semantic labels associated with the digital content depicted in the various locations or regions to, for example, indicate where "trees" are located versus where "sky" is located or where "water" is located.

As used herein, the term "digital content" refers to a digital representation of items, objects, or spaces within a digital image. For example, digital content includes a depiction or a portrayal of a digital object by a collection or a group of pixels of a digital image. In some cases, digital content is separated into regions or locations within a digital image, where the regions are separated by boundaries of different semantic labels. For instance, a first digital content region of a digital images includes pixels depicting "sky" while a second digital content region of the same digital image includes pixels depicting "mountains," where "sky" and "mountains" are corresponding semantic labels.

As mentioned above, the deep image manipulation system 102 receives a scene layout map indicating regions or locations of digital content depicted within one or more digital images. As used herein, the term "scene layout map" refers to a reference or an indicator defining regions, locations, and/or boundaries of classes of digital content depicted within a digital image. For example, a scene layout map includes a layout or an arrangement of different types of digital content (e.g., digital content corresponding to different labels). In some cases, a scene layout map enforces the semantic boundaries of the differently labeled digital content to, for instance, prevent "tree" pixels from being placed within a "sky" region and vice-versa. In certain embodiments, the scene layout map includes firm boundaries (e.g., boundaries with strict enforcement where only pixels of a particular label are allowed to be placed) as well as soft boundaries (e.g., boundaries with less stringent enforcement where a threshold number of differently labeled pixels are allowed, or where a threshold amount of region overlap is allowed). In some embodiments, a scene layout map is represented as a tensor that retains one-hot encodings for each class/label at each region of a reference digital image.

As also mentioned, in some embodiments, the deep image manipulation system utilizes an encoder neural network to extract a structure code from a digital image. As used herein, the term "structure code" refers to a tensor or a vector of structure features that describes or defines the geometric structure of a digital image. For example, a structure code includes a tensor of latent features that, though not necessarily discernable by a human observer, are interpretable by the swapping autoencoder to describe the geometric structure of a digital image.

Along similar lines, the term "texture code" refers to a tensor or a vector of texture features that describes or defines the textural appearance, the visual style, or the aesthetic of a digital image. For example, a texture code includes a tensor of latent features that are not necessarily discernable by a human observer, but that are interpretable by the swapping autoencoder to determine the textural appearance of a digital image.

In addition, the term "feature" refers to digital information describing all or part of a digital image. For example, features are represented as vectors, tensors, or codes (e.g., latent codes such as structure codes or texture codes) that the deep image manipulation system extracts utilizing a swapping autoencoder. In some cases, features include observable characteristics or observable information pertaining to a digital image such as a color or a geometric layout. In other cases, features include latent features (e.g., features within the various layers of a neural network and that may change as they are passed from layer to layer) and/or unobservable deep features generated by a swapping autoencoder. Thus, a "texture feature" refers to a feature of a texture code corresponding to a textural appearance such as a texture style, a motif, an illumination, a color scheme, a shading style, an applicator style, and/or a perspective of digital content depicted within a digital image. Additionally, the term "structure feature" refers to a feature corresponding to the geometric structure of a digital image such as a spatial layout, a relative positioning, and/or an arrangement of various digital content depicted within the digital image.

Additional detail regarding the deep image manipulation system will now be provided with reference to the figures. For example, FIG. 1 illustrates a schematic diagram of an example system environment for implementing a deep image manipulation system 102 in accordance with one or more embodiments. An overview of the deep image manipulation system 102 is described in relation to FIG. 1. Thereafter, a more detailed description of the components and processes of the deep image manipulation system 102 is provided in relation to the subsequent figures.

As shown, the environment includes server(s) 104, a client device 108, a database 114, and a network 116. Each of the components of the environment communicate via the network 116, and the network 116 is any suitable network over which computing devices can communicate. Example networks are discussed in more detail below in relation to FIG. 13.

As mentioned, the environment includes a client device 108. In some embodiments, the client device 108 includes one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single client device 108, in some embodiments the environment includes multiple different client devices, each associated with a different user. The client device 108 communicates with the server(s) 104 via the network 116. For example, the client device 108 receives user input from a user interacting with the client device 108 (e.g., via the client application 110) to, for example, select a digital image, edit a digital image, modify an attribute of a digital image, or generate a modified digital image. Thus, the deep image manipulation system 102 on the server(s) 104 receives information or instructions to generate a modified digital image (e.g., by extracting and combining texture codes and structure codes) based on the input received by the client device 108.

As shown, the client device 108 includes a client application 110. In particular, the client application 110 includes a web application, a native application installed on the client device 108 (e.g., a mobile application, a desktop application, etc.), or a cloud-based application where all or part of the functionality is performed by the server(s) 104. Through the client application 110, the client device 108 presents or displays information to a user, including a user interface for editing, manipulating, creating, or otherwise interacting with a digital image. Additionally, the client application 110 presents interactive elements in the form of buttons or tools selectable to edit a digital image or to generate a new digital image. A user interacts with the client application 110 to provide user input to perform an operation as mentioned above, such as manipulating a digital image to modify an attribute or selecting (or creating) a reference digital image from which to generate a scene layout map.

As illustrated in FIG. 1, the environment includes the server(s) 104. The server(s) 104 generate, track, store, process, receive, and transmit electronic data, such as digital images, structure codes, texture codes, and user interactions to manipulate digital images. For example, the server(s) 104 receives data from the client device 108 in the form of a request to edit a digital image. In addition, the server(s) 104 transmits data to the client device 108 to provide a modified digital image for display within a user interface of the client application 110. Indeed, the server(s) 104 communicates with the client device 108 to transmit and/or receive data via the network 116. In some embodiments, the server(s) 104 comprises a distributed server where the server(s) 104 includes a number of server devices distributed across the network 116 and located in different physical locations. In one or more embodiments, the server(s) 104 comprise a content server, an application server, a communication server, a web-hosting server, or a machine learning server.

As shown in FIG. 1, the server(s) 104 also includes the deep image manipulation system 102 as part of a digital content editing system 106. The digital content editing system 106 communicates with the client device 108 to perform various functions associated with the client application 110 such as extracting structure codes, extracting texture codes, and generating a modified digital image. In addition, the digital content editing system 106 and/or the deep image manipulation system 102 learns parameters of a swapping autoencoder 112 by training or tuning an encoder neural network and a generator neural network of the swapping autoencoder 112 utilizing a discriminator neural network. In some embodiments, the digital content editing system 106 and/or the deep image manipulation system 102 utilizes various loss functions as part of the training process.

As further shown in FIG. 1, the environment includes a database 114. In particular, the database 114 stores information such as digital images, structure codes, and texture codes. For example, the database 114 includes a digital image code repository of structure codes and texture codes to utilize with one or more loss functions as part of the parameter learning process. In some embodiments, the database 114 also stores one or more components of the swapping autoencoder 112 such as an encoder neural network and/or a generator neural network.

Although FIG. 1 illustrates a particular arrangement of the environment, in some embodiments, the environment has a different arrangement of components and/or has a different number or set of components altogether. For instance, in some embodiments, the deep image manipulation system 102 is implemented by (e.g., located entirely or in part on) the client device 108 and/or a third-party device. In addition, in some cases, the client device 108 communicates directly with the deep image manipulation system 102, bypassing the network 116. Further, in certain embodiments, the database 114 is located external to the server(s) 104 (e.g., in communication via the network 116) or located on the server(s) 104 and/or on the client device 108.

Figure 2:
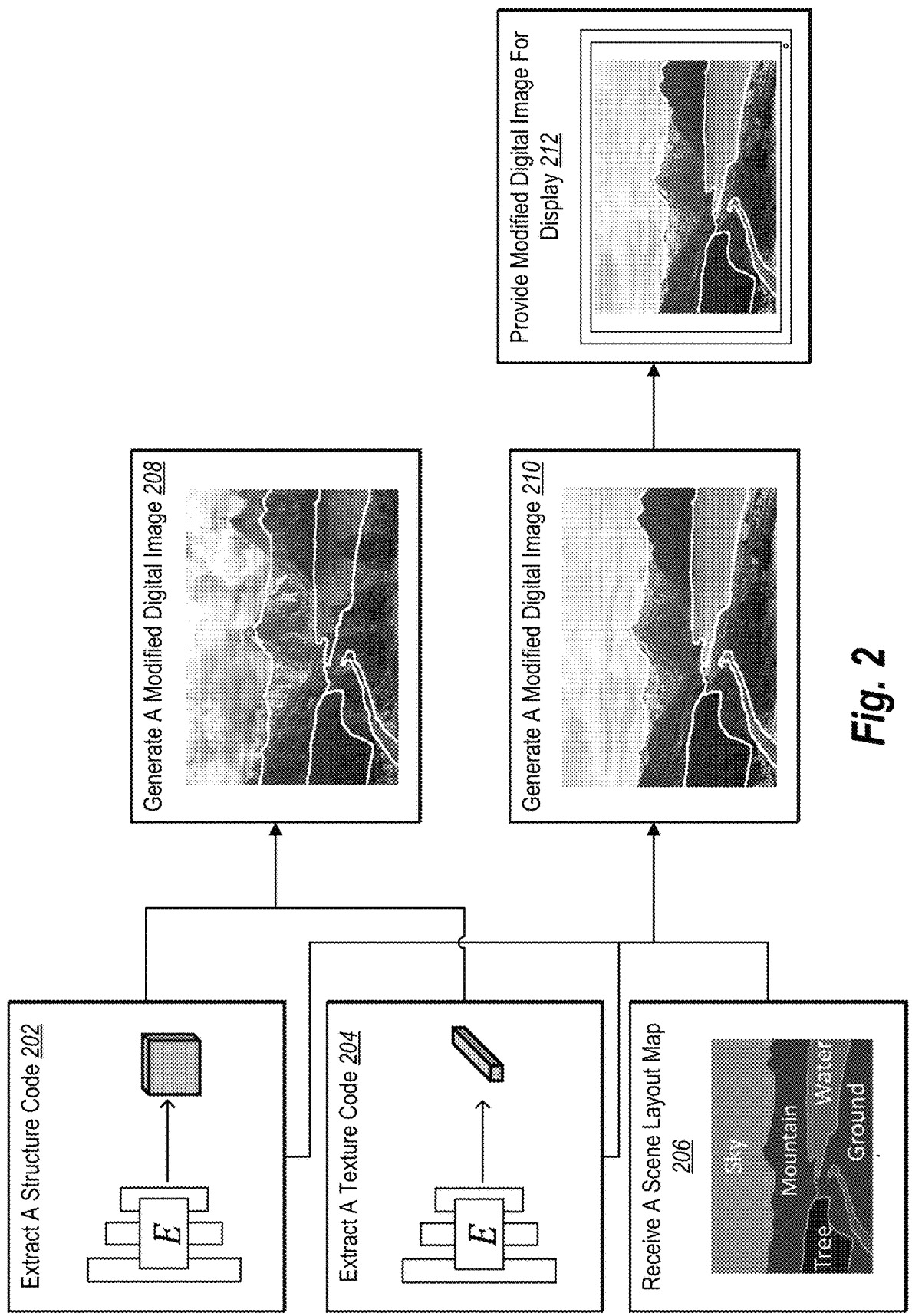
FIG. 2 illustrates a sequence of acts for generating and providing a modified digital image utilizing a swapping autoencoder to incorporate a scene layout map in accordance with one or more embodiments.

As mentioned, in embodiments described herein, the deep image manipulation system 102 generates and provides a modified digital image for display based on extracting and combining a structure code and a texture code while at least partially constraining the layout based on a scene layout. In some cases, the deep image manipulation system 102 extracts a structure code and a texture code from the same digital image, while in other cases, the deep image manipulation system 102 extracts a structure code from one digital image and extracts a texture code from a different digital image. In addition, the deep image manipulation system 102 combines the structure code and the texture code in accordance with a scene layout map that defines locations for where various digital content is to be displayed within a modified digital image. FIG. 2 illustrates an example sequence of acts for generating and providing a modified digital image utilizing a structure code, a texture code, and a scene layout map in accordance with one or more embodiments. The description of FIG. 2 provides an overview of acts involved in generating and providing a modified digital image, and additional detail is provided thereafter with reference to subsequent figures.

FIG. 2 provides a comparison of generating a modified digital image via two different sets of acts: one set of acts without utilizing a scene layout map, and another set of acts with utilizing a scene layout map. Indeed, as shown in FIG. 2, the deep image manipulation system 102 generates a first modified digital image utilizing acts 202 and 204 to extract a structure code and a texture code (without utilizing a scene layout map). In some embodiments, the deep image manipulation system 102 generates a second modified digital image utilizing acts 202, 204, and 206 to incorporate a structure code, a texture code, and a scene layout map. As shown, the second modified digital image (incorporating the scene layout map) depicts digital content within semantic boundaries of the scene layout map, while the first digital image depicts digital content that crosses or otherwise violates the semantic boundaries. While the modified digital images in FIG. 2 depict white border lines between different semantic regions, this is illustrative for discussion purposes to compare the different modified digital images.

As illustrated in FIG. 2, the deep image manipulation system 102 performs an act 202 to extract a structure code. In particular, the deep image manipulation system 102 utilizes an encoder neural network (represented by the "E") to extract a structure code (represented by the wide, shallow rectangular prism). For example, the deep image manipulation system 102 processes a digital image utilizing the encoder neural network to identify or determine a geometric arrangement of various digital content depicted within the digital image. The deep image manipulation system 102 further generates a vector of structure features representing the geometric structure of the digital image. In some cases, the deep image manipulation system 102 extracts multiple structure codes from multiple digital images.

As also illustrated in FIG. 2, the deep image manipulation system 102 performs an act 204 to extract a texture code. More particularly, the deep image manipulation system 102 utilizes an encoder neural network to extract a texture code (represented by the narrow, deep rectangular prism). For example, the deep image manipulation system 102 processes a digital image to identify or determine a textural appearance or a style of the digital content depicted within the digital image. In some cases, the deep image manipulation system 102 extracts the texture code from the same digital image processed to extract the structure code. In other cases, the deep image manipulation system 102 extracts the texture code from a different digital image. For instance, the deep image manipulation system 102 extracts multiple texture codes from multiple digital images. The deep image manipulation system 102 further generates a vector of texture features representing the textural appearance of the digital image.

As further illustrated in FIG. 2, the deep image manipulation system 102 performs an act 208 to generate a modified digital image. In particular, the deep image manipulation system 102 generates a modified digital image by combining the structure code and the texture code extracted as part of the acts 202 and 204. As shown, the deep image manipulation system 102 generates a modified digital image depicting digital content that does not fit boundaries indicated by the scene layout map. Indeed, the trees and mountains portrayed in the modified digital image extend beyond the designated regions for such labeled digital content.

In addition to extracting a structure code and a texture code, in certain embodiments, the deep image manipulation system 102 further performs an act 206 to receive a scene layout map. More specifically, the deep image manipulation system 102 identifies or receives a scene layout map that defines locations or regions for depicting particular types of digital content. In some embodiments, the deep image manipulation system 102 receives the scene layout map from the client device 108 based on user interaction selecting or creating the scene layout map.

Alternatively, the deep image manipulation system 102 generates the scene layout map from a reference digital image selected via user interaction with the client device 108. Indeed, the deep image manipulation system 102 utilizes a semantic segmentation neural network to generate a scene layout map by processing the reference digital image to determine regions and boundaries of digital content depicted within the digital image. As another example, the deep image manipulation system 102 receives a scene layout map drawn or otherwise created via the client device 108.

In one or more embodiments, the deep image manipulation system 102 receives or generates a scene layout map that indicates a particular region of an input digital image to be modified. More specifically, the deep image manipulation system 102 receives a scene layout map that indicates a region where digital content is to be modified or replaced within a digital image. As an example, the input digital image includes only a depiction of a field and sky (e.g., a "field" region and a "sky" region), and the scene layout map includes a water region to be added to the field (where there was no water initially). For instance, the scene layout map indicates a modified "field" region, a new "water" region, and the "sky" region.

As further illustrated in FIG. 2, the deep image manipulation system 102 performs an act 210 to generate a modified digital image. Specifically, the deep image manipulation system 102 generates a modified digital image by combining an extracted structure code with an extracted texture code in accordance with a scene layout map. Indeed, the deep image manipulation system 102 utilizes a generator neural network to combine a structure code with a texture code to generate a modified digital image. In some embodiments, the deep image manipulation system 102 combines a structure code and a texture code extracted from the same digital image. In other embodiments, the deep image manipulation system 102 combines a structure code and a texture code from different digital images. In these embodiments, the deep image manipulation system 102 generates a modified digital image depicting a geometric structure associated with a digital image from which the structure code was extracted and further depicting a textural appearance associated with a digital image from which the texture code was extracted.

In certain embodiments, the deep image manipulation system 102 combines a structure code and a texture code as guided by a scene layout map. To elaborate, the deep image manipulation system 102 generates a modified digital image by utilizing a generator neural network to enforce, at least partially, the boundaries indicated by scene layout map. For instance, the deep image manipulation system 102 prevents digital content corresponding to a first label from being added to a portion of the modified digital image corresponding to a region of the scene layout map indicating a second label. In this fashion, the deep image manipulation system 102 keeps digital content of different labels within respective regions, as indicated by the scene layout map, when generating a modified digital image.

In some embodiments, the deep image manipulation system 102 generates a modified digital image by adding new digital content not present in the initial digital image. For example, the deep image manipulation system 102 replaces a portion of digital content with new digital content. In some embodiments, the deep image manipulation system 102 replaces digital content by replacing a portion of structure code associated with an input digital image with new structure code indicated by a scene layout map. As an example, the deep image manipulation system 102 replaces a portion of the structure code for a "field" region of an input digital image with structure code for a "water" portion to add a pond to the field within a modified digital image.

Indeed, the deep image manipulation system 102 performs an act 212 to provide the modified digital image for display. In particular, the deep image manipulation system 102 provides the modified digital image for display on the client device 108. In some embodiments, the deep image manipulation system 102 generates and provides the digital image in response to a user interaction to generate a modified digital image. For instance, the deep image manipulation system 102 receives a user interaction to modify a portion of an input digital image by adding or replacing particular digital content and/or by altering a visual style or textural appearance of the input digital image.

Figure 3:
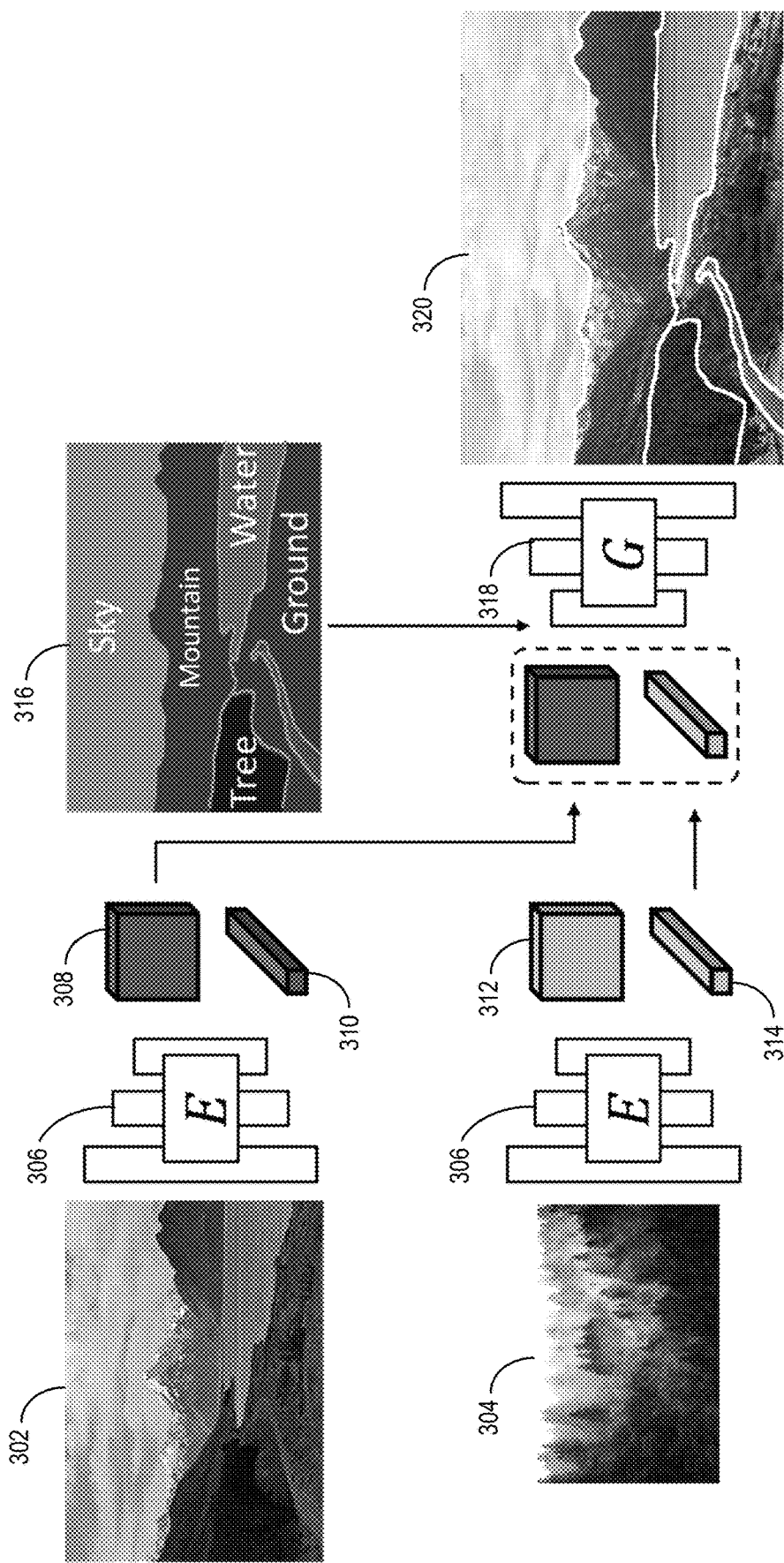
FIG. 3 illustrates an example process for generating a modified digital image utilizing a swapping autoencoder to incorporate a scene layout map in accordance with one or more embodiments.

As mentioned, in certain embodiments described herein, the deep image manipulation system 102 utilizes a swapping autoencoder to generate a modified digital image with altered geometric structure and/or textural appearance. In particular, the deep image manipulation system 102 utilizes an encoder neural network and a generator neural network (as part of a swapping autoencoder) to generate a modified digital image. FIG. 3 illustrates utilizing an encoder neural network 306 and a generator neural network 318 to generate modified digital image 320 from a first digital image 302 and a second digital image 304 in accordance with one or more embodiments.

As illustrated in FIG. 3, the deep image manipulation system 102 utilizes a swapping autoencoder (e.g., the swapping autoencoder 112) that includes the encoder neural network 306 and the generator neural network 318 to generate the modified digital image 320 from the first digital image 302 and the second digital image 304. In particular, the deep image manipulation system 102 utilizes the encoder neural network 306 to extract a structure code 308 and a texture code 310 from the first digital image 302. Indeed, the deep image manipulation system 102 applies the encoder neural network 306 to the first digital image 302 to extract structural features for the structure code 308 and textural features for the texture code 310.

In a similar fashion, the deep image manipulation system 102 utilizes the encoder neural network 306 to extract the structure code 312 and the texture code 314 from the second digital image 304. More specifically, the deep image manipulation system 102 extracts structural features from the second digital image 304 for the structure code 312. In addition, the deep image manipulation system 102 extract textural features from the second digital image 304 for the texture code 314.

As further shown in FIG. 3, the deep image manipulation system 102 utilizes the same encoder neural network 306 to extract latent codes for swapping from each of the first digital image 302 and second digital image 304. In some embodiments, however, the deep image manipulation system 102 utilizes two separate encoders: a structural encoder neural network to extract the structure code 308 (and the structure code 312) and a textural encoder neural network to extract the texture code 310 (and the texture code 314).

In addition to extracting structure codes and texture codes, the deep image manipulation system 102 receives, accesses, or generates a scene layout map 316. More specifically, the deep image manipulation system 102 receives the scene layout map 316 that defines regions or locations for depicting digital content. As shown, the scene layout map 316 includes regions for digital content such as "Sky," "Tree," "Mountain," "Water," and "Ground." The scene layout map 316 further defines the boundaries between the digital content of the different labels.

As further illustrated in FIG. 3, the deep image manipulation system 102 generates the modified digital image 320 by combining or otherwise modifying latent codes extracted from the first digital image 302 and the second digital image 304 in accordance with the scene layout map 316. For example, the deep image manipulation system 102 selects an extracted structure code from one digital image (e.g., the first digital image 302 or the second digital image 304) and an extracted texture code from another digital image (e.g., the other of the first digital image 302 or the second digital image 304) to combine together.

As shown, the deep image manipulation system 102 selects the structure code 308 and the texture code 314 to combine. Indeed, the deep image manipulation system 102 utilizes the generator neural network 318 to, in accordance with the scene layout map 316, combine a first structure code (e.g., the structure code 308 from the first digital image 302) with a second texture code (e.g., the texture code 314 from the second digital image 304) to generate the modified digital image 320. Thus, the deep image manipulation system 102 generates the modified digital image 320 to have the geometric structure of the first digital image 302 (modified in accordance with the scene layout map 316) and the textural appearance of the second digital image 304.

Indeed, as a result of utilizing the first structure code 308 and the second texture code 314, the modified digital image 320 includes the geometric structure or layout of the first digital image 302 (modified according to the scene layout map 316) with the textural appearance or style of the second digital image 304. Indeed, as shown in FIG. 2, the modified digital image 320 portrays a mountain lake scene with placement of mountains, sky, water, trees, and ground defined by the scene layout map 316. In addition, the modified digital image 320 portrays the shading and color scheme (e.g., with lots of greens colors and thicker clouds) of the second digital image 304 (from the texture code 314).

In addition, the modified digital image 320 has the layout of the scene layout map 316 that defines the locations of the depicted digital content.

In addition to generating the modified digital image 320 by swapping latent codes (e.g., swapping structure codes and texture codes between the first digital image 302 and the second digital image 304), the deep image manipulation system 102 can generate modified digital images by modifying latent codes to edit attributes or blend styles. In some embodiments, the deep image manipulation system 102 utilizes a swapping autoencoder, including the encoder neural network 306 and the generator neural network 318 as described by Taesung Park, Richard Zhang, Oliver Wang, Junyan Zhu, Jingwan Lu, Elya Shectman, and Alexei A. Efros in U.S. patent application Ser. No. 16/874,399 entitled Generating Modified Digital Images Utilizing a Swapping Autoencoder (2020), which is incorporated by reference herein in its entirety. In some cases, the deep image manipulation system 102 modifies the swapping autoencoder described by Park et al. by utilizing one or more different loss functions. Additional detail regarding the loss functions is provided below with reference to subsequent figures.

In certain embodiments, the deep image manipulation system 102 performs a step for generating a modified digital image utilizing the texture code, the structure code, and the scene layout map. The above description of FIGS. 2-3, including the acts of FIG. 2 and the additional detail provided in relation to FIG. 3, provide various embodiments and supporting acts and algorithms for performing a step for generating a modified digital image utilizing the texture code, the structure code, and the scene layout map. For example, in some embodiments, the step for generating a modified digital image utilizing the texture code, the structure code, and the scene layout map includes generating, utilizing the generator neural network 318, a modified digital image comprising digital content of a first digital image and digital content of a second digital image arranged according to the scene layout map by combining: a first structure code (from the first digital image) and a second texture code (from the second digital image) in accordance with the scene layout map, or a first texture code (from the first digital image) and a second structure code (from the second digital image) in accordance with the scene layout map.

Figure 4:
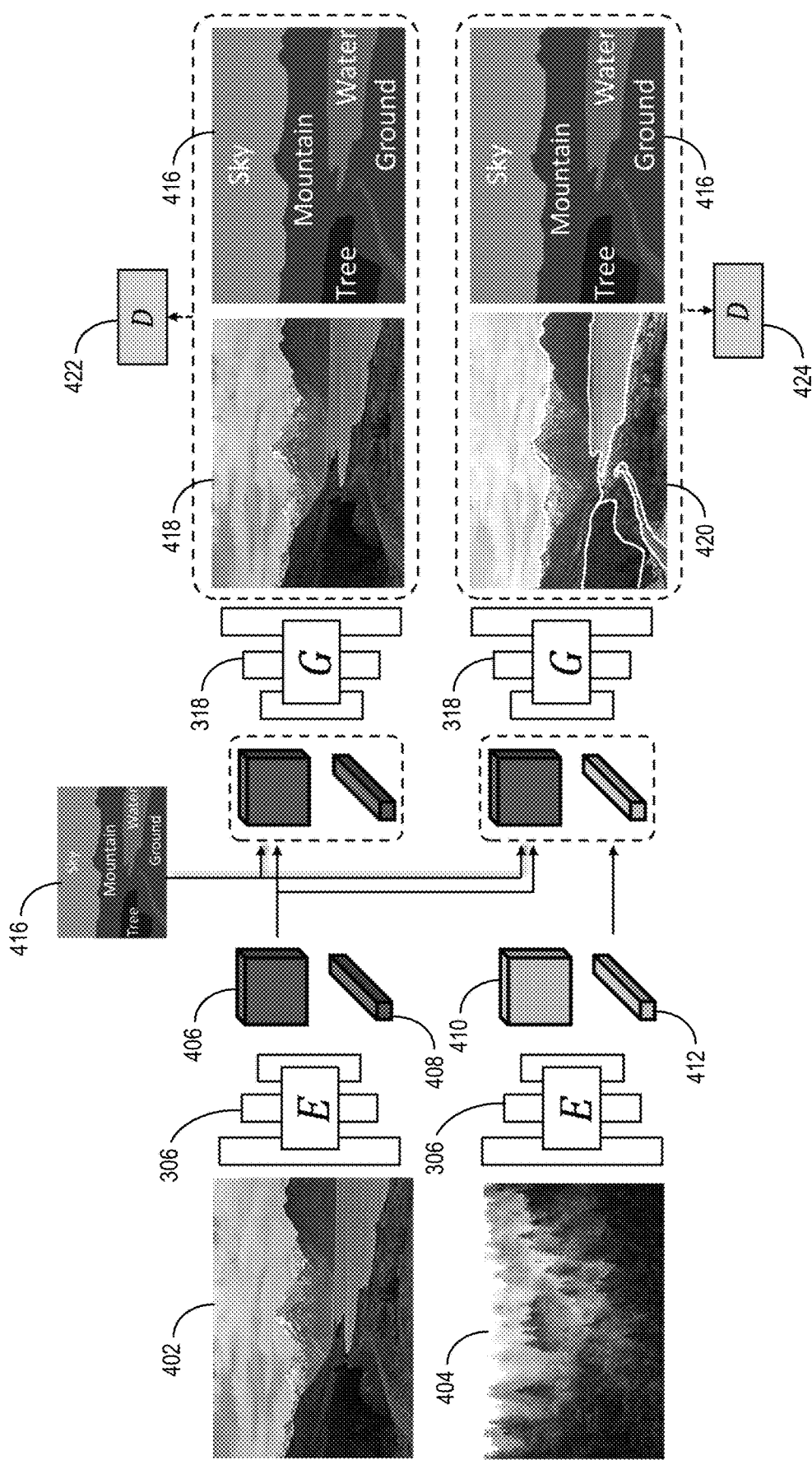
FIG. 4 illustrates an example process for learning parameters of a swapping autoencoder for generating reconstructed digital images and modified digital images in accordance with one or more embodiments.

As mentioned above, in certain embodiments, the deep image manipulation system 102 learns parameters for the swapping autoencoder to accurately generate modified digital images by swapping latent codes. In particular, the deep image manipulation system 102 learns parameters for the encoder neural network 306 and the generator neural network 318. FIG. 4 illustrates an example process for learning parameters of swapping autoencoder, including the encoder neural network 306 and the generator neural network 318, in accordance with one or more embodiments.

As illustrated in FIG. 4, the deep image manipulation system 102 utilizes a discriminator neural network 422 to learn parameters associated with generating a reconstructed digital image 418 from a first digital image 402. As also illustrated in FIG. 4, the deep image manipulation system 102 additionally or alternatively utilizes a discriminator neural network 424 to learn parameters associated with generating a modified digital image 420 from the first digital image 402 and the second digital image 404.

Relating to learning parameters associated with generating the reconstructed digital image 418 from the first digital image 402, the encoder neural network 306 maps the first digital image 402 to a latent space, and the generator neural network 318 does the reverse by generating a digital image (e.g., the reconstructed digital image 418) from the latent feature representation. In particular, encoder neural network 306 maps the first digital image 402 given by:

$$x \in \mathbb{R}^{H \times W \times 3}$$

where x represents the first digital image 402, H represents the height of the image, W represents the width of the image, and 3 is the number of channels in an RGB image (i.e. red, green, and blue). For example, the encoder neural network 306 maps the first digital image 402 to a latent space Z, and the generator neural network 318 generates the reconstructed digital image 418 from the encoding in the latent space Z. In some embodiments, the encoder neural network 306 (E) includes or represents two different encoders: a structural encoder neural network $E_s$ and a textural encoder neural network $E_t$ that extract structure codes and texture codes, respectively.

The deep image manipulation system 102 learns parameters of the encoder neural network 306 and the generator neural network 318 such as weights or other internal network parameters that enable the swapping autoencoder 112 to generate individual elements of latent code (e.g., structure codes versus texture codes) that represent disentangled factors of input digital images such as the first digital image 402 (e.g., so that factors are not represented by both the structure codes and the texture codes). To more explicitly ensure this disentanglement, the deep image manipulation system 102 factors the latent space Z into two components: a structure code 406 and a texture code 408. For example, the deep image manipulation system 102 generates a structure code having the form:

$$z_s \in Z_s \sim \mathbb{R}^{H_s \times W_s \times C_s}$$

and a texture code having the form:

$$z_t \in Z_t \sim \mathbb{R}^{1 \times 1 \times C_t}$$

where $z_s$ represents a structure code (e.g., the structure code 406), $z_t$ represents a texture code (e.g., the texture code 408), $Z_s$ represents a structural component of the latent space Z, $Z_t$ represents a textural component of the latent space Z, $H_s$ represents a height of the structure code, $W_s$ represents a width of the structure code, $C_s$ represents a length of the structure code, and $C_t$ represents a length of the texture code. In some embodiments, the deep image manipulation system 102 implements a texture code length $C_t$=1024, a structure code length $C_s$=1 or 2, and a spatial dimensionality of 32 or 64, depending on the dataset of digital images.

To learn the parameters that enable the swapping autoencoder 112 to generate the reconstructed digital image 418 as an accurate representation of the first digital image 402, the deep image manipulation system 102 utilizes one or more loss functions. Indeed, with each iteration of analyzing a new input digital image to generate a reconstructed digital image as part of the parameter learning, the deep image manipulation system 102 utilizes loss functions to modify internal parameters of the encoder neural network 306 and/or the generator neural network 318.

More specifically, for successive iterations, the deep image manipulation system 102 utilizes loss functions to evaluate a performance of the swapping autoencoder 112 by determining an error or a measure of loss associated with generating a reconstructed digital image (e.g., the reconstructed digital image 418) from an input digital image (e.g., the first digital image 402). The deep image manipulation system 102 further modifies various weights or other internal parameters of the swapping autoencoder 112 based on the error or measure of loss utilizing gradient-based back propagation. Thus, over multiple iterations of analyzing new input digital images, generating corresponding reconstructed digital images, determining measures of loss, and modifying internal parameters of the encoder neural network 306 and the generator neural network 318 to reduce the loss, the deep image manipulation system 102 tunes the encoder neural network 306 and the generator neural network 318 to accurately generate reconstructed digital images from input digital images.

Relating to the loss functions, the deep image manipulation system 102 utilizes a reconstruction loss to compare the reconstructed digital image 418 with the first digital image 402. In some embodiments, without incorporating the scene layout map 416, the deep image manipulation system 102 utilizes a reconstruction loss in the form of:

$$\mathcal{L}_{rec,img}(E,G) = \mathbb{E}_{x \sim X}[\|x - G(E_s(x), E_t(x))\|_1]$$

where $\mathcal{L}_{rec,img}(E,G)$ represents the reconstruction loss between the reconstructed digital image 418 (rec) and the first digital image 402 (img) associated the encoder neural network 306 (E) and the generator neural network 318 (G), x represents a latent code mapping of the first digital image 402 (as defined above), X denotes a training image distribution, $E_s$ represents the structural encoder neural network (as defined above), and $E_t$ represents the textural encoder neural network (as defined above). In some cases, the above reconstruction loss function is expressed as:

$$\mathcal{L}_{rec,img}(E,G) = \mathbb{E}_{x \sim X}[\|x - G(E(x))\|_1]$$

where E represents the encoder neural network 306 and includes the structural encoder neural network $E_s$ and the textural encoder neural network $E_t$.

In some embodiments, the deep image manipulation system 102 modifies the above reconstruction loss function to accommodate the incorporation of the scene layout map 416. To elaborate, the deep image manipulation system 102 combines the scene layout map 416 with the structure code 406 and the texture code 408 using spatially adaptive denormalization ("SPADE") modulation at every scale. Particularly, the deep image manipulation system 102 implements SPADE modulation by utilizing the scene layout map 416 for modulating activations in normalization layers through a spatially adaptive learned transformation. Indeed, the deep image manipulation system 102 modulates activations using a spatially adaptive normalization layer to conditionally normalize the activations using the scene layout map 416. Thus, the generator neural network 318 takes the scene layout map 416 as input along with the structure code 406 and the texture code 408.

As a result, the deep image manipulation system 102 modifies the above loss function to have the form:

$$\mathcal{L}_{rec,img}(E,G) = \mathbb{E}_{x \sim X}[\|x - G(E(x), z_l)\|_1]$$

or $$\mathcal{L}_{rec,img}(E,G) = \mathbb{E}_{x \sim X}[\|x - G(E_s(x), E_t(x), z_l)\|_1]$$

where $z_l \in \{0,1\}^{H \times W \times C}$ is a tensor of one-hot encodings representing the scene layout of x (defined above). In some cases, $z_l$ is a tensor that represents or includes the scene layout map 416. To elaborate, the deep image manipulation system 102 generates one-hot encodings to represent or reference individual regions of a reference digital image to include within $z_l$. To ensure that the generator neural network 318 considers (e.g., does not ignore) the scene layout map 416 in generating digital images, the deep image manipulation system 102 conditions both discriminators 422 and 424 on the scene layout map 416.

For instance, the deep image manipulation system 102 concatenates a sample digital image (e.g., a stored digital image within the database 114 used for parameter learning with the discriminator neural network 422) with its corresponding scene layout and further concatenates the reconstructed digital image 418 with the scene layout map 416. Indeed, the deep image manipulation system 102 determines scene layouts for stored digital images and concatenates the scene layouts onto their respective digital images for testing with the discriminator neural network 422 against generated digital images (e.g., the reconstructed digital image 418).

To elaborate, in addition to the reconstruction loss function, the deep image manipulation system 102 can also utilize a GAN loss associated with a discriminator neural network 422. During training, the deep image manipulation system 102 implements a discriminator neural network 422 in competition with the generator neural network 318. Indeed, the generator neural network generates reconstructions, and the discriminator neural network 422 attempts to distinguish generated reconstructions from actual stored data (e.g., from a digital image repository). For example, based on the first digital image 402, the generator neural network 318 generates the reconstructed digital image 418 which is concatenated with the scene layout map 416 and provided together to the discriminator neural network 422. In turn, the discriminator neural network 422 compares the concatenated digital image (e.g., including the reconstructed digital image 418 and the scene layout map 416) with an actual digital image from a database (e.g., the database 114) concatenated with its corresponding scene layout to identify or select which concatenated digital image is real (e.g., from the database).

In some embodiments, the deep image manipulation system 102 utilizes the GAN loss to further help the reconstructed digital image 418 look realistic. Along with (or as part of) the GAN loss, the deep image manipulation system 102 simultaneously trains the discriminator neural network 422 to identify if an image is generated by the generator neural network 318 or is from a real dataset. For example, the deep image manipulation system 102 utilizes a GAN loss given by:

$$\mathcal{L}_{GAN,rec}(E,G,D) = \mathbb{E}_{x \sim X}[-\log(D(G(E(x),z_l),z_l))]$$

where $\mathcal{L}_{GAN,rec}(E, G, D)$ represents the GAN loss for reconstructing digital images, D represents the discriminator neural network 422, and the remaining terms are defined above. As shown, the GAN loss is an adversarial loss. In some embodiments, the deep image manipulation system jointly trains the discriminator neural network 422 (D) with a simplified gradient penalty regularization $\mathbb{E}_{x \sim X} \|\nabla_x D(x)\|_2$ and a default weight of 10.

By utilizing the GAN loss and the reconstruction loss, the deep image manipulation system 102 determines how accurate the swapping autoencoder 112 is when generating reconstructed digital images and is able to improve the accuracy over subsequent iterations. For instance, the deep image manipulation system 102 continues training the encoder neural network 306 and the generator neural network 318 over multiple iterations, inputting new input digital images to generate new reconstructed digital images, determining losses, and modifying parameters for each iteration. Thus, upon determining that the GAN loss and/or the reconstruction loss each satisfy a threshold loss, the deep image manipulation system 102 determines that the encoder neural network 306 and the generator neural network 318 are accurate. Indeed, by combining the extracted structure code 406 and the extracted texture code 408, the generator neural network 318 generates the reconstructed digital image 418 to accurately represent the first digital image 402. As shown in FIG. 4, the reconstructed digital image 418 looks very similar, if not identical, to the first digital image 402.

Relating to learning parameters associated with generating the modified digital image 420 from the first digital image 402 and the second digital image 404, the deep image manipulation system 102 utilizes a reconstruction loss and a GAN loss (for the discriminator neural network 424) similar to those described above. In particular, the deep image manipulation system 102 learns to extract structure codes and texture codes that are accurate for reconstructing digital images but that are also accurate for mixing with codes of other digital images.

As shown in FIG. 4, the deep image manipulation system 102 learns parameters for the swapping autoencoder 112 based on swapping structure codes and texture codes between pairs of digital images. To elaborate, the deep image manipulation system 102 utilizes the encoder neural network 306 to extract the structure code 406 and the texture code 408 from the first digital image 402. In addition, the deep image manipulation system 102 utilizes the encoder neural network 306 to extract the structure code 410 and the texture code 412 from the second digital image 404. As shown, the deep image manipulation system 102 generates the modified digital image 420 by utilizing the generator neural network 318 to combine the structure code 406 from the first digital image 402 with the texture code 412 from the second digital image 404.

Further, the deep image manipulation system 102 utilizes a GAN loss associated with the discriminator 414 to determine an error or a measure of loss associated with the swapping autoencoder 112 and to encourage realistic hybrid digital images. In particular, the deep image manipulation system 102 utilizes a GAN loss given by:

$$\mathcal{L}_{GAN,swap}(E,G,D) = \mathbb{E}_{x^1,x^2 \sim X, x^1 \ne x^2}[-\log(D((G(z_s^1,z_t^2,z_l^1),z_l^1)))]$$

where $x^1$ represents a latent code representation of the first digital image 402, $x^2$ represents a latent code representation of the second digital image 404, $z_s^1$ represents the structure code 406 from the first digital image 402, $z_t^2$ represents the texture code 412 from the second digital image 404, $z_l^1$ represents the scene layout of $x^1$, and the other terms are defined above. In some cases, $z_l^1$ represents or includes the scene layout map 416. Thus, the deep image manipulation system 102 forces the discriminator neural network 424 to determine whether a digital image is real (e.g., from the database 114) and to determine whether the digital image follows the scene layout map 416. In one or more embodiments, utilizing this GAN loss alone may not be enough for the deep image manipulation system 102 to constrain the swapping autoencoder 112 to generate a hybrid of the first digital image 402 and the second digital image 404 while adhering to the scene layout map 416, as the GAN loss is related only to the realism of the resultant digital image.

Thus, to improve the generation of hybrid digital images, the deep image manipulation system 102 utilizes an additional loss function called a co-occurrence loss. In particular, the deep image manipulation system 102 utilizes a co-occurrence loss to learn parameters for reconstructing or combining particular codes (e.g., the structure code 406 and the texture code 412) extracted from the first digital image 402 ($x^1$) and the second digital image 404 ($x^2$). For example, the deep image manipulation system 102 encourages the texture code $z_t$ to maintain the same texture in any swap-generated images. In some embodiments, the deep image manipulation system 102 utilizes a patch cooccurrence discriminator $D_{patch}$ to determine whether individual sampled patches are real (e.g., from a stored digital image) or generated.

Thus, the generator neural network 318 aims to generate a hybrid digital image G ($z_s^1$, $z_t^2$) such that (the texture of) any patch from the generated hybrid digital image (e.g., the modified digital image 420) cannot be distinguished from (the texture of) a group of patches from the input $x^2$. In some embodiments, the deep image manipulation system 102 utilizes a co-occurrence loss having the form:

$$\mathcal{L}_{Cooccur,GAN}(E,G,D_{patch}) = \mathbb{E}_{x^1,x^2 \sim x}[-\log(D_{patch}(\text{crop}(G(z_s^1,z_t^2,z_l^1),z_l^1),\text{crops}(x^2,z_l^2)))]$$

where crop(•) selects a random patch of size ⅛ to ¼ of the full image dimension on each side, crops (•) is a collection of multiple patches, and the remaining terms are defined above. Utilizing this co-occurrence loss function, the deep image manipulation system 102 ensures that corresponding patches (e.g., patches in corresponding locations) in generated digital images (e.g., the modified digital image 420) have the same or similar texture to those of the second digital image 404 (or the digital image from which a texture code is extracted).

In one or more embodiments, the deep image manipulation system 102 utilizes an objective function to learn parameters for the encoder neural network 306 and the generator neural network 318. For example, the deep image manipulation system 102 utilizes an objective function given by:

$$\mathcal{L}_{total} = \mathcal{L}_{rec} + 0.5\mathcal{L}_{GAN,rec} + 0.5\mathcal{L}_{GAN,swap} + \mathcal{L}_{Cooccur,GAN}$$

where the terms are as defined above.

In certain embodiments, the deep image manipulation system 102 generates the scene layout map 416. For example, the deep image manipulation system 102 generates the scene layout map 416 utilizing a semantic segmentation neural network (e.g., a deep convolutional neural network). Particularly, the deep image manipulation system 102 utilizes a semantic segmentation neural network to analyze, using atrous or dilated convolution, a reference digital image (e.g., a digital image selected or uploaded via the client device 108) to identify regions where digital content of different labels is displayed. Indeed, in some cases, the deep image manipulation system 102 receives user interaction selecting or uploading a reference digital image from which to generate a scene layout map (e.g., the scene layout map 416).

To the scene layout map 416, the deep image manipulation system 102 learns parameters for the semantic segmentation neural network. In particular, the deep image manipulation system 102 trains the semantic segmentation neural network utilizing the COCO-stuff database to classify digital content depicted within the sample digital images of the database using 171 different labels. In some embodiments, the deep image manipulation system 102 merges classification labels of the COCO-stuff dataset to simplify the generation of scene layout maps. For example, rather than having "concrete" and "brick" as separate labels, the deep image manipulation system 102 merges these separate labels into a single label. Example labels that are merged into a single label include: i) "fog," "sky-other," and "clouds," ii) "water-other," "waterdrops," "sea," and "river," iii) "ground-other", "playingfield," "pavement," "road," "gravel," "mud," "dirt," "snow," "sand," "solid-other," "hill," "mountain," "stone," "rock," "wood," "plant-other," "straw," "moss," "branch," "flower," "leaves," "bush," "tree," and "grass,", and iv) "wall-other," "wall-concrete," "wall-stone," "wall-brick," "wall-wood," "wall-panel," "wall-tile," "window-other," and "window-blind."

Although FIG. 4 illustrates the modified digital image 420 with visible white borders demarcating the semantic regions indicated by the scene layout map 416, this is merely illustrative. Indeed, the white borders illustrate how the deep image manipulation system 102 is able to generate the modified digital image with altered structural layout and textural appearance utilizing the scene layout map 416. In actuality, the deep image manipulation system 102 generates the modified digital image 420 without including such visible boundaries between different labeled regions.

Figure 5:
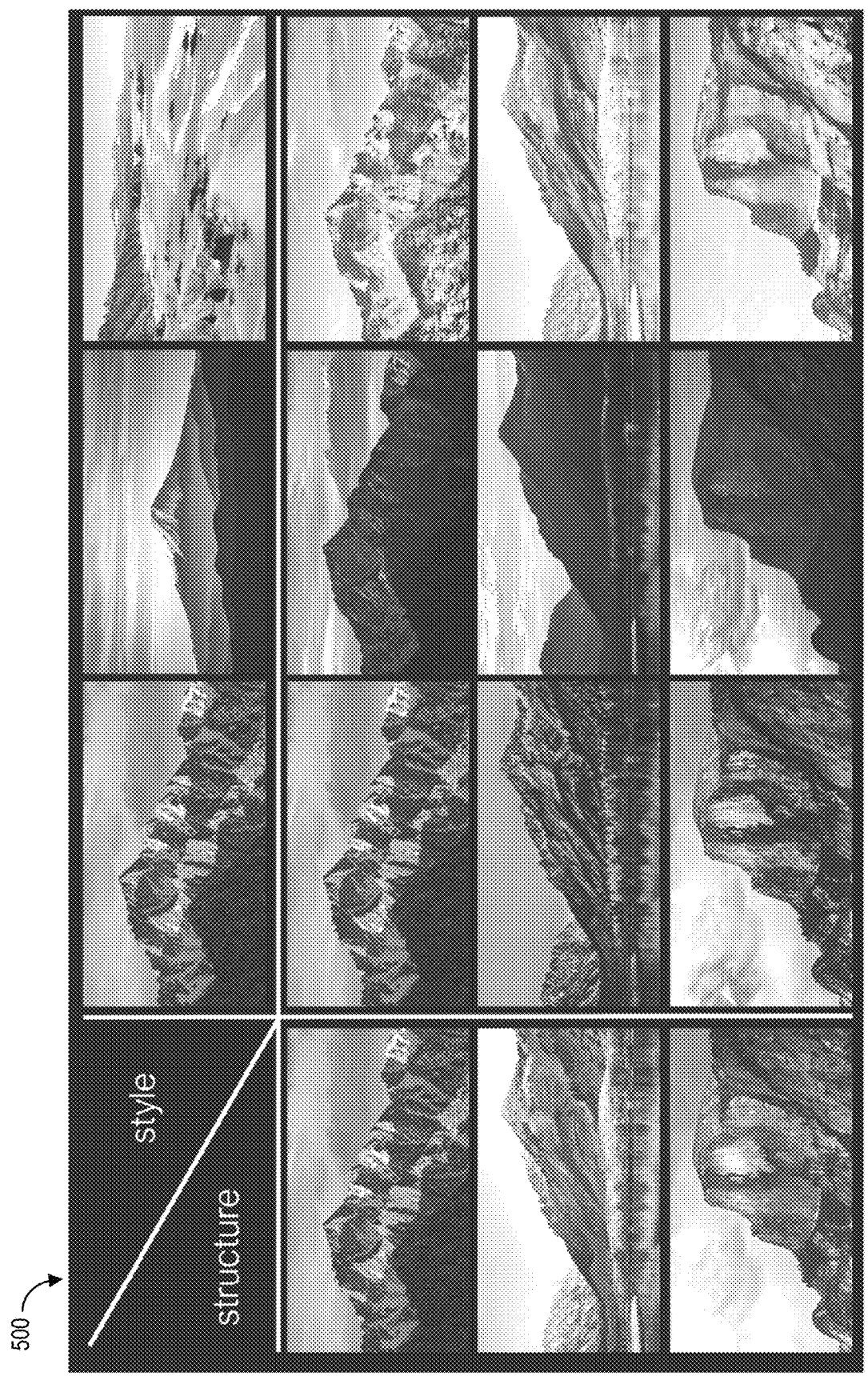
FIG. 5 illustrates an example table of modified digital images in accordance with one or more embodiments.

As mentioned above, in certain embodiments, the deep image manipulation system 102 generates modified digital images by swapping latent codes between input digital images and in accordance with a scene layout map. In particular, the deep image manipulation system 102 generates modified digital images with the structural layout of one digital image (as modified by a scene layout map) and the textural appearance of another digital image. FIG. 5 illustrates a table 500 of including example input digital images and modified digital images in accordance with one or more embodiments.

As illustrated in FIG. 5, the table 500 includes a row of input digital images along the top that the deep image manipulation system 102 utilizes to extract style, or to extract texture codes. In addition, the table 500 includes a column of input digital images along the left that the deep image manipulation system 102 utilizes to extract structure codes and scene layout maps. At the cross-sections of each row and column, the table 500 further illustrates modified digital images that the deep image manipulation system 102 generates by combining the style images along the top with the structure images along the left, in accordance with a scene layout map generated from the image in the column.

For example, the bottom-right modified digital image depicts a cliff face having the structure of the bottom-left structure image (in accordance with a scene layout map) and the textural appearance (e.g., style) of the top-right style image. Indeed, the bottom-right modified digital image depicts a cliff face in the same shape as (or a similar to) the cliff face of the bottom-left structure image. In addition, the bottom-right modified digital image portrays the color scheme and shading style of the top-right style digital image. Likewise, the other modified digital images within the table 500 depict combinations resulting from latent code swapping of respective input digital images.

Figure 6:
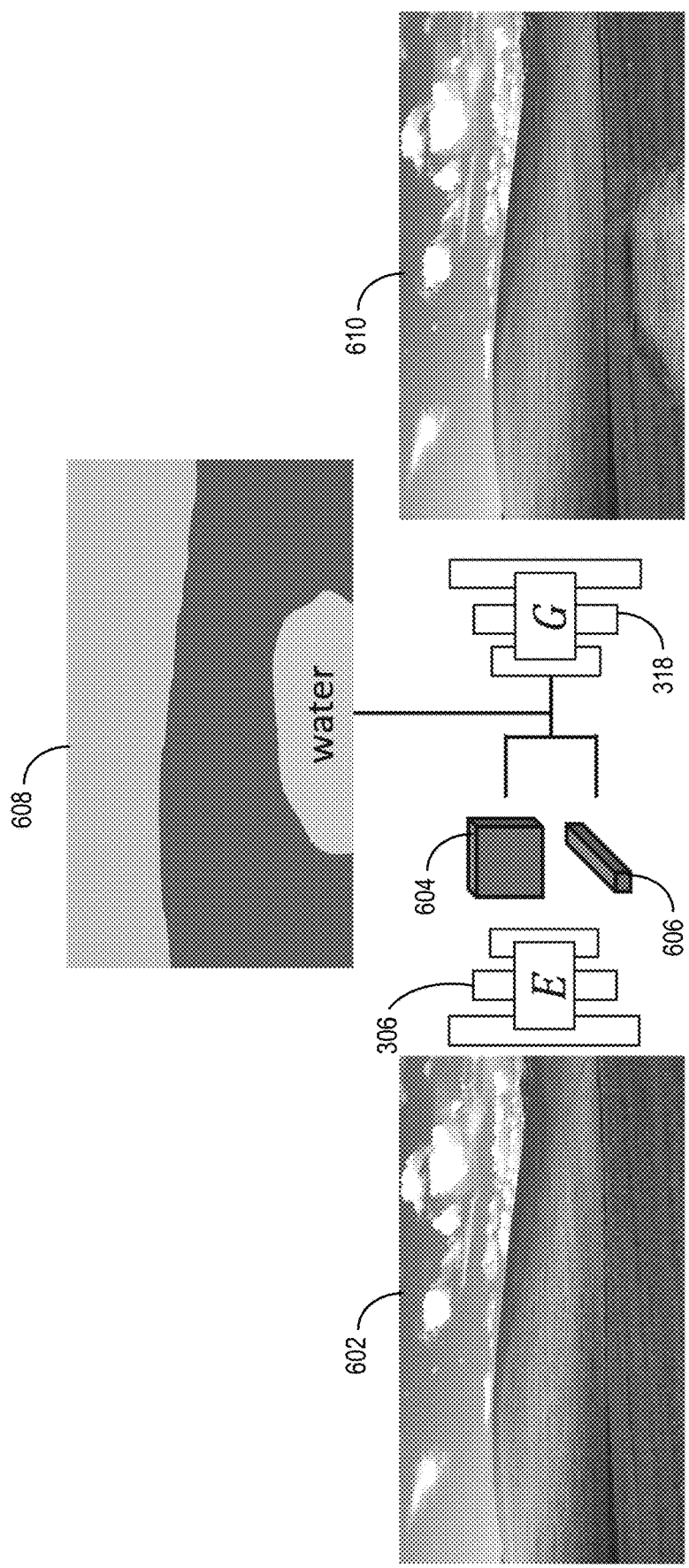
FIG. 6 illustrates an example process for generating a modified digital image utilizing a swapping autoencoder for scene editing in accordance with one or more embodiments.

As mentioned, in certain described embodiments, the deep image manipulation system 102 generates a modified digital image by incorporating digital content through scene editing. In particular, the deep image manipulation system 102 edits an input digital image by incorporating digital content into the digital image that was not originally depicted. FIG. 6 illustrates a process for generating a modified digital image 610 from an input digital image 602 by incorporating digital content (e.g., "water") indicated by a scene layout map 608.

As illustrated in FIG. 6, the deep image manipulation system 102 utilizes the swapping autoencoder 112, including the encoder neural network 306 and the generator neural network 318, to generate the modified digital image 610 based on the input digital image 602. In particular, the deep image manipulation system 102 utilizes the encoder neural network 306 to extract a structure code 604 and a texture code 606 from the input digital image 602. In addition, the deep image manipulation system 102 combines the structure code 604 and the texture code 606 with the scene layout map 608, as described above. For example, the deep image manipulation system 102 modifies the structure code 604 in accordance with the scene layout map 608.

Indeed, the deep image manipulation system 102 utilizes the generator neural network 318 to generate the modified digital image 610 by combining structure code 604 and the texture code 606 in accordance with the scene layout map 608. For instance, the deep image manipulation system 102 receives the scene layout map 608 that indicates various portions or regions of digital content, including the "water" region not found in the input digital image 602. As shown, the darker portion of the scene layout map 608 corresponds to a "ground" label, while the lighter unlabeled portion above corresponds to a "sky" label. For instance, the deep image manipulation system 102 generates the scene layout map 608 in response to user interaction selecting a reference digital image (e.g., the input digital image 602) and editing the reference digital image to include the "water" region.

Thus, the deep image manipulation system 102 utilizes the generator neural network 318 to generate the modified digital image 610 that depicts water in a region corresponding to the "water" region of the scene layout map 608. Other than the "water" region, the deep image manipulation system 102 reconstructs the input digital image 602 for generating the modified digital image 610. Indeed, as shown, the modified digital image 610 looks like the input digital image 602, except for the added water in the portion corresponding to the "water" region of the scene layout map 608.

To generate the portion of the digital image depicting the water, the deep image manipulation system 102 modifies the structure code 604 to replace a portion of the structure code 604 corresponding to the "water" region of the scene layout map 608. In particular, the deep image manipulation system 102 replaces the portion by identifying or generating a uniform structure code for the entire "water" region. Indeed, the deep image manipulation system 102 utilizes a set of additional sample digital images to determine a structure code for replacing the portion corresponding to the "water" region.

For example, the deep image manipulation system 102 generates clusters of the sample digital images and selects representative structure codes from the clusters. More specifically, the deep image manipulation system 102 analyzes the structure codes of the sample digital images to determine average-pooled structure codes for the portions of the sample digital images corresponding to the "water" region. For example, the deep image manipulation system 102 analyzes a first sample digital image to determine an average structure code for the region of the first sample digital image that corresponds to the "water" region. The deep image manipulation system 102 likewise average-pools structure codes for portions of other sample digital images corresponding to the "water" region.

In addition, the deep image manipulation system 102 utilizes a k-means clustering algorithm to generate structure code clusters from the structure codes corresponding to the sample digital images. For instance, the deep image manipulation system 102 clusters like structure codes together. In some embodiments, the deep image manipulation system 102 generates a particular number of clusters and selects a representative structure code from each cluster.

Indeed, the deep image manipulation system 102 determines representative structure codes for the clusters of structure codes corresponding to the sample digital images. In some cases, the deep image manipulation system 102 determines a centroid of a given cluster and selects a structure code at (or nearest to) the centroid as the representative structure code for the given cluster. In other cases, the deep image manipulation system 102 determines an average structure code from the structure codes within a given cluster. In any event, the deep image manipulation system 102 determines and selects a representative structure code to replace the portion of the structure code 604 corresponding to the "water" region of the scene layout map 608. Then the deep image manipulation system 102 utilizes the generator neural network 318 to decode the combination of the modified structure code 604 and the texture code 606 to generate the modified digital image 610.

Figure 7:
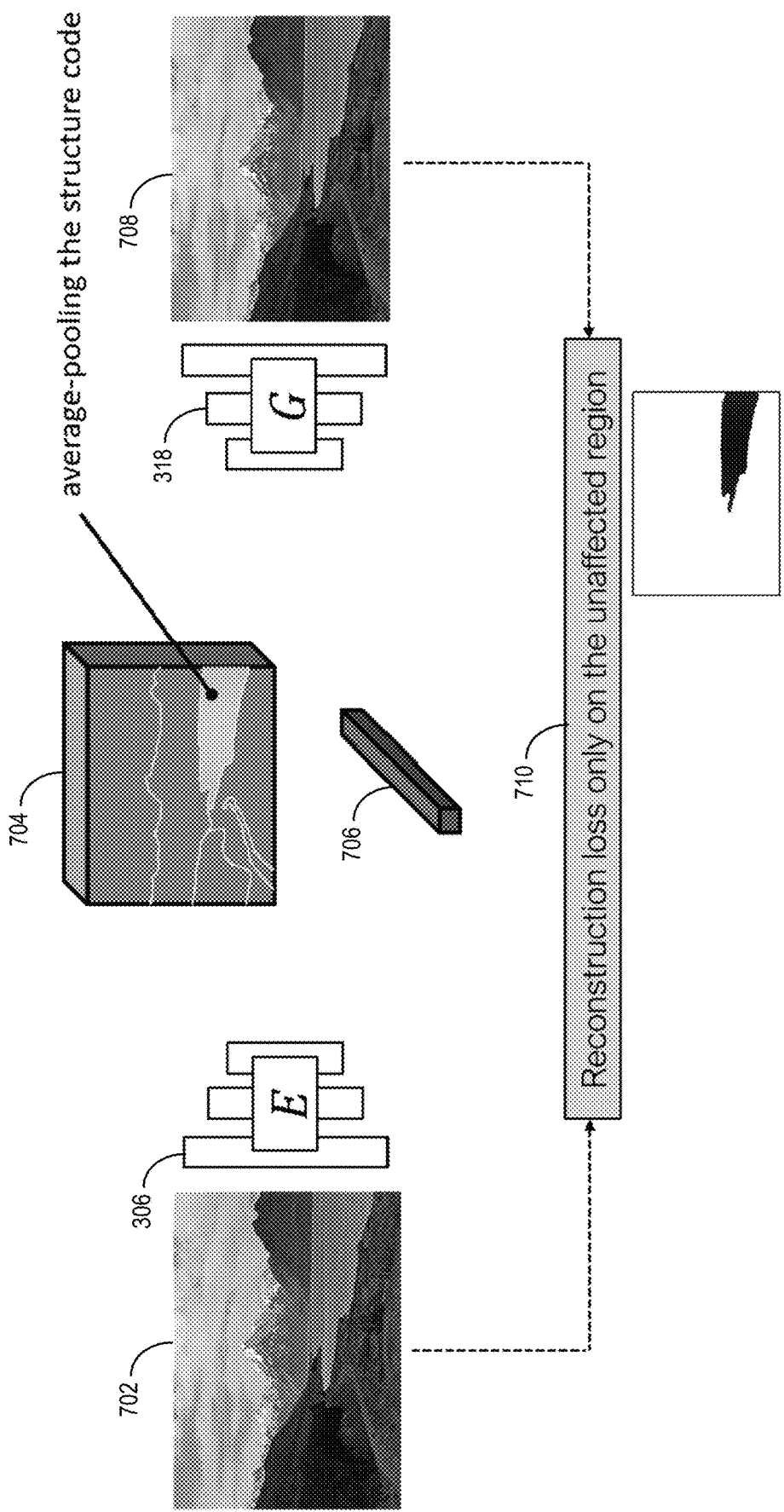
FIG. 7 illustrates an example process for learning parameters for a swapping autoencoder for scene editing in accordance with one or more embodiments.

As suggested above, in some embodiments, the deep image manipulation system 102 learns parameters for the swapping autoencoder 112 in implementations for scene editing. More specifically, the deep image manipulation system 102 learns parameters of the encoder neural network 306 and the generator neural network 318 for modifying or adding digital content to a digital image. FIG. 7 illustrates a process of learning parameters for the swapping autoencoder 112 (including the encoder neural network 306 and the generator neural network 318) for scene editing in accordance with one or more embodiments.

As illustrated in FIG. 7, the deep image manipulation system 102 utilizes the encoder neural network 306 to extract a structure code 704 and a texture code 706 from the input digital image 702. In addition, the deep image manipulation system 102 selects a portion of the structure code 704 to perform average pooling. As shown, for instance, the deep image manipulation system 102 selects the portion corresponding to region of the lake illustrated in the input digital image 702. Indeed, at each iteration of parameter learning, the deep image manipulation system 102 (randomly) selects a region of the extracted structure code (e.g., the structure code 704) from the respective input digital image (e.g., the input digital image 702) and performs average pooling of the structure codes corresponding to the selected region. In addition, the deep image manipulation system 102 stores the average-pooled structure codes (e.g., within the database 114) to retain structure codes to utilize for scene editing.

As illustrated in FIG. 7, the deep image manipulation system 102 further utilizes the generator neural network 318 to generate the reconstructed digital image 708. Further, the deep image manipulation system 102 utilizes one or more loss functions as described above. For example, the deep image manipulation system 102 utilizes a reconstruction loss function and/or a GAN loss function. However, because the detailed location-specific information about the input digital image 702 is discarded by the average pooling process, the deep image manipulation system 102 does not enforce the L1 reconstruction loss 710 on the affected (e.g., the edited or modified) region (e.g., the "water" region). Rather, the deep image manipulation system 102 determines a reconstruction loss 710 only on the unaffected region(s) of the input digital image 702 and/or the reconstructed digital image 708.

Figure 8:
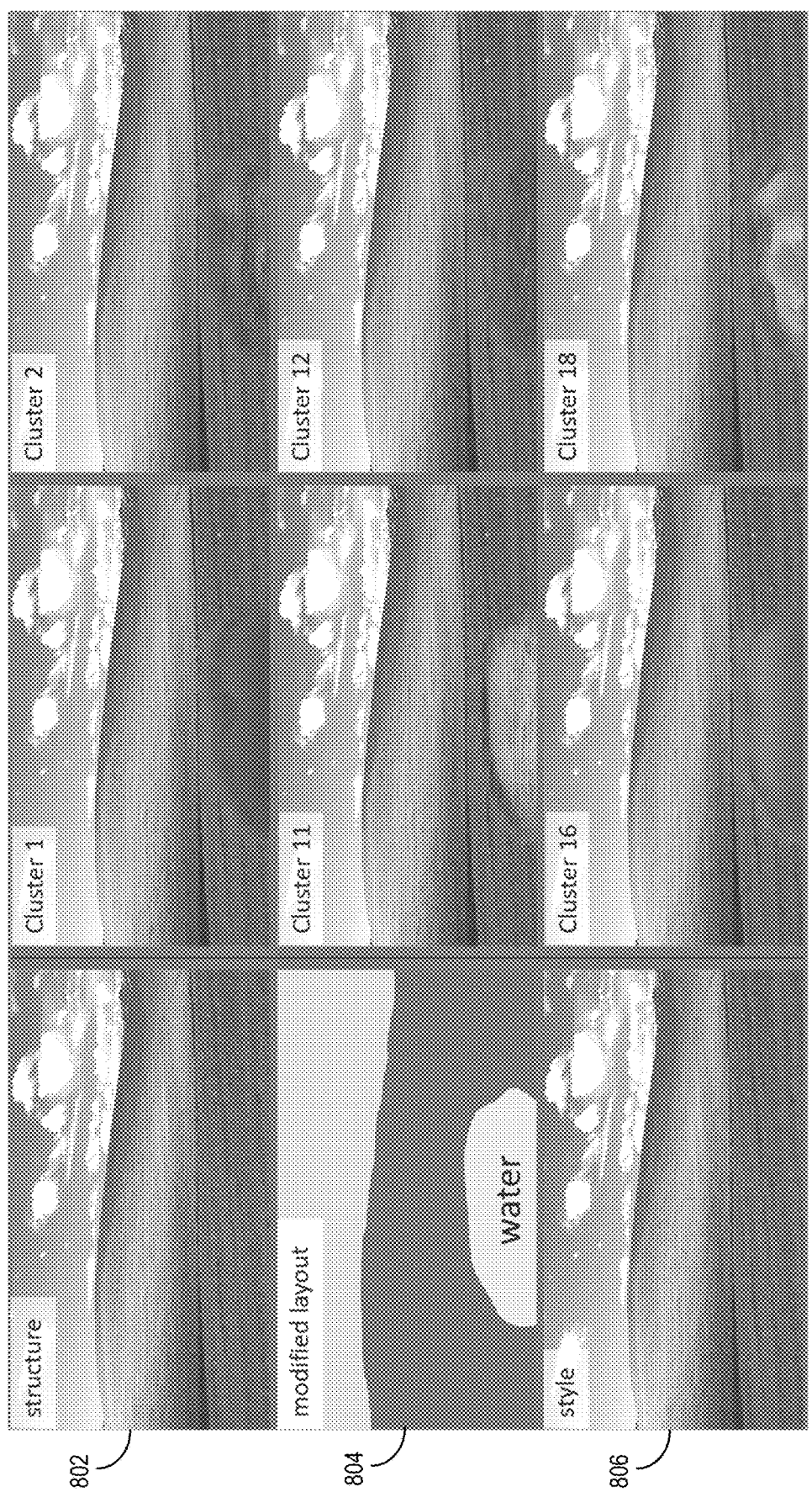
FIG. 8 illustrates an example table of modified digital images resulting from scene editing in accordance with one or more embodiments.

As mentioned above, in one or more embodiments, the deep image manipulation system 102 generates modified digital images by implementing scene editing to add or modify digital content. In particular, the deep image manipulation system 102 adds digital content not originally depicted in a digital image by replacing a portion of the structure code of the digital image in accordance with a scene layout map. Specifically, the deep image manipulation system 102 determines and selects representative structure codes from structure code clusters associated with sample digital images used for training. FIG. 8 illustrates a table of modified digital images resulting from replacing structure code of the structure digital image 802 with representative structure codes from various clusters in accordance with one or more embodiments.

As illustrated in FIG. 8, the structure digital image 802 is a digital image from which the deep image manipulation system 102 extracts a structure code. Conversely, the style digital image 806 is a digital image from which the deep image manipulation system 102 extracts a feature code. Additionally, the scene layout map 804 indicates regions of digital content corresponding to different labels, such as the "water" region not portrayed in the structure digital image 802 (nor the style digital image 806). As described herein, the deep image manipulation system 102 generates modified digital images by combining an extracted structure code from the structure digital image 802 (modified according to the scene layout map 804) with the extracted texture code from the style digital image 806.

For example, as shown in FIG. 8, the deep image manipulation system 102 generates a plurality of modified digital images, each corresponding to a different cluster of structure codes. To elaborate, the deep image manipulation system 102 selects a representative (e.g., centroid or average) structure code from each of a plurality of structure code clusters. The deep image manipulation system 102 replaces a portion of the structure code of the structure digital image 802 (e.g., a portion corresponding to the "water" region indicated by scene layout map 804) with the representative structure code to add new digital content (e.g., "water").

As shown in FIG. 8, the deep image manipulation system 102 generates six different modified digital images corresponding to cluster 1, cluster 2, cluster 11, cluster 12, cluster 16, and cluster 18. Each of the modified digital images depicts a pond corresponding to the "water" region indicated in the scene layout map 804. However, the water in each modified digital image has a different appearance due to the different representative structure codes from each cluster. Indeed, by selecting different representative structure codes from the different clusters of structure codes (obtained from sample digital images during parameter learning), the deep image manipulation system 102 generates ponds with different appearances.

Figure 9:
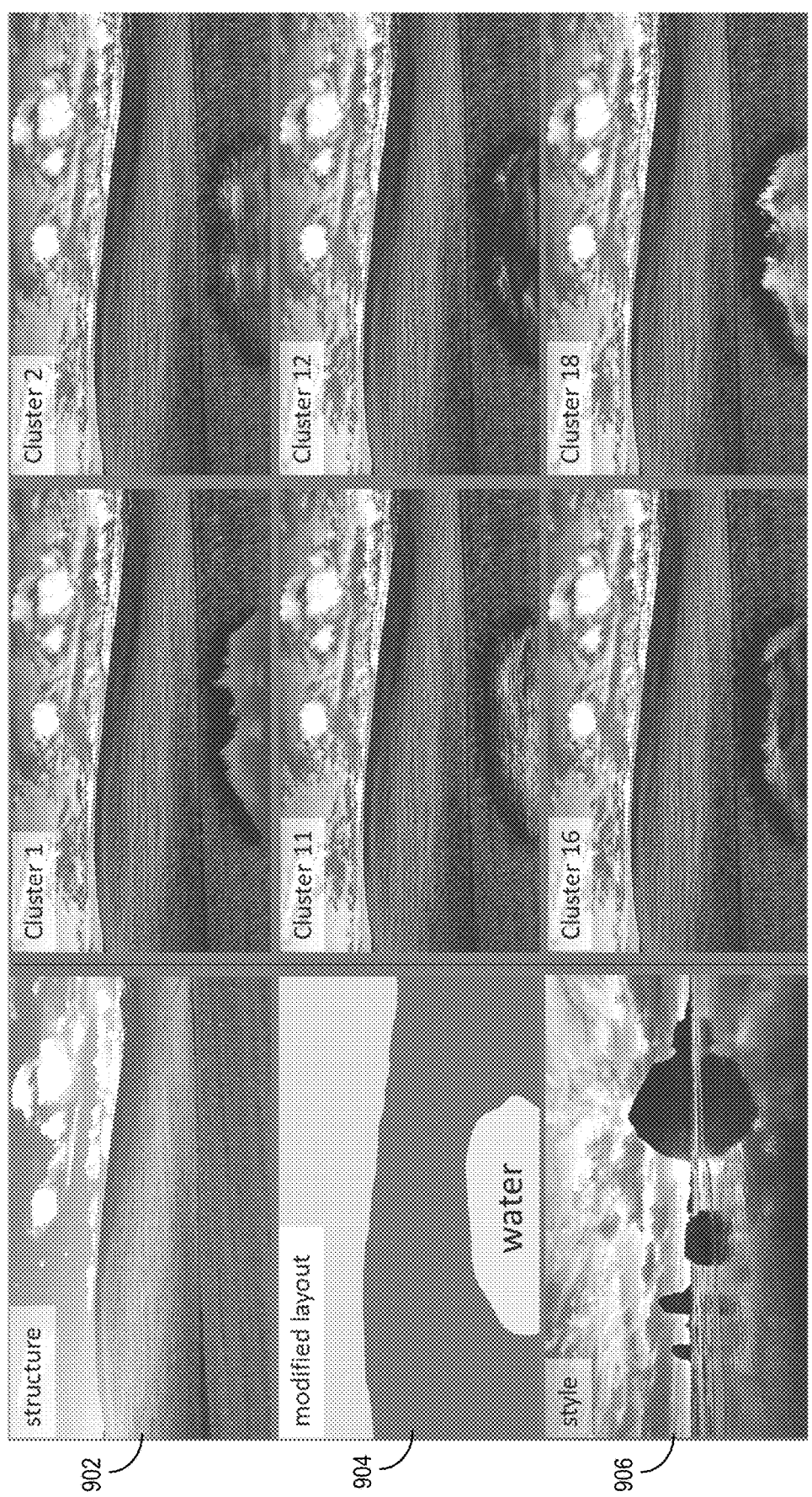
FIG. 9 illustrates another example table of modified digital images resulting from scene editing in accordance with one or more embodiments.

In one or more embodiments, the deep image manipulation system 102 generates modified digital images by performing both scene editing and latent code swapping. In particular, the deep image manipulation system 102 combines a structure code form a first digital image with a texture code from a second digital image while also modifying the structure code of the first digital image to incorporate structure code for new digital content. FIG. 9 illustrates a table of modified digital images generated by swapping latent codes while also scene editing in accordance with one or more embodiments.

As illustrated in FIG. 9, the structure digital image 902 is a digital image from which the deep image manipulation system 102 extracts a structure code. Conversely, the style digital image 906 is a digital image from which the deep image manipulation system 102 extracts a feature code. Additionally, the scene layout map 904 indicates regions of digital content corresponding to different labels, such as the "water" region not portrayed in the structure digital image 902 (nor the style digital image 906). As described herein, the deep image manipulation system 102 generates modified digital images by combining an extracted structure code from the structure digital image 902 (modified according to the scene layout map 904) with the extracted texture code from the style digital image 906.

Similar to the discussion of FIG. 8, the deep image manipulation system 102 generates modified digital images corresponding to different clusters. Indeed, as described, the deep image manipulation system 102 selects representative structure codes from clusters generated via k-means clustering of average-pooled structure codes from sample digital images. As illustrated in FIG. 9, the deep image manipulation system 102 thus generates the modified digital images by replacing a portion of the structure code from the structure digital image 902 with the different representative structure codes from the different clusters. As shown, the modified digital images have the geometric layout of the structure digital image 902 with the textural appearance of the style digital image 906, where geometric structure is modified according to the scene layout map 904 to include the "water" region.

Figure 10:
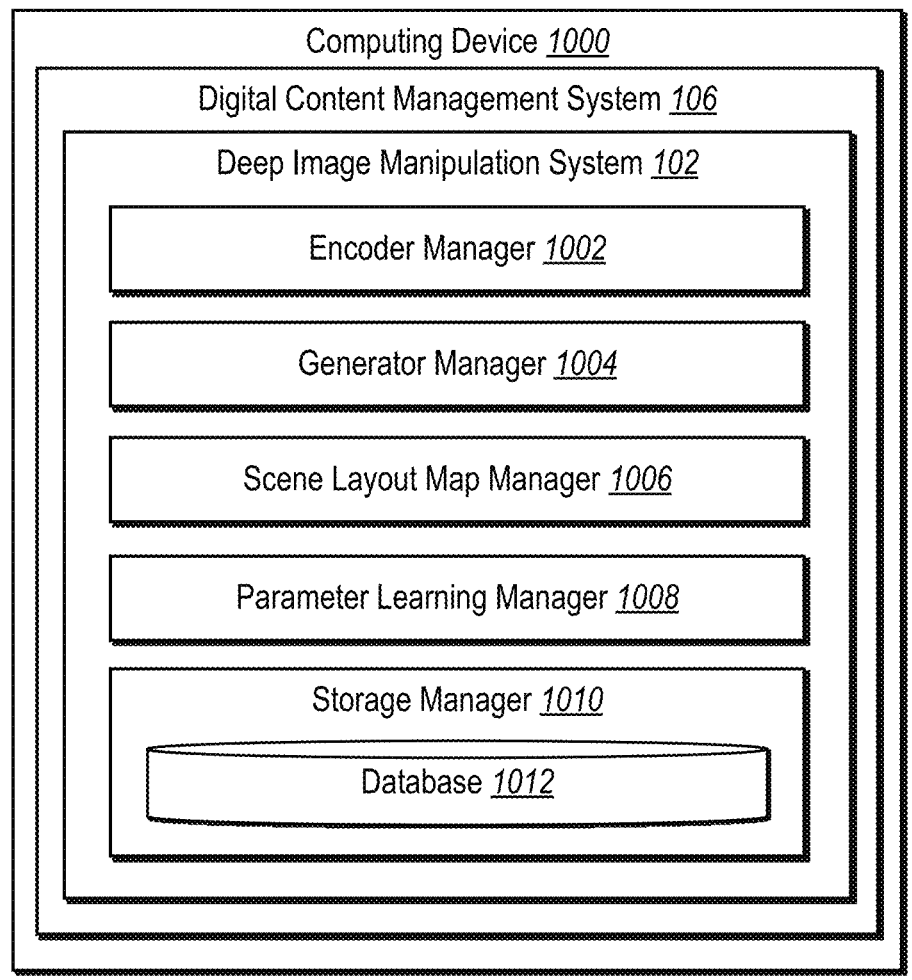
FIG. 10 illustrates a schematic diagram of a deep image manipulation system in accordance with one or more embodiments.

Looking now to FIG. 10, additional detail will be provided regarding components and capabilities of the deep image manipulation system 102. Specifically, FIG. 10 illustrates an example schematic diagram of the deep image manipulation system 102 on an example computing device 1000 (e.g., one or more of the client device 108 and/or the server(s) 104). As shown in FIG. 10, the deep image manipulation system 102 includes an encoder manager 1002, a generator manager 1004, a scene layout map manager 1006, a parameter learning manager 1008, and a storage manager 1010.

As just mentioned, the deep image manipulation system 102 includes an encoder manager 1002. In particular, the encoder manager 1002 manages, maintains, stores, utilizes, implements, accesses, or applies an encoder neural network (e.g., the encoder neural network 306). For example, the encoder manager 1002 utilizes an encoder neural network to extract a structure code and a texture code from one more digital images, as described above. In some embodiments, the encoder manager 1002 extracts a texture code and a structure code from a single digital image. In other embodiments, the encoder manager 1002 extracts a structure code from a first digital image and extracts a texture code from a second digital image.

As shown, the deep image manipulation system 102 also includes a generator manager 1004. In particular, the generator manager 1004 manages, maintains, stores, utilizes, implements, accesses, or applies a generator neural network (e.g., the generator neural network 318). For example, the generator manager 1004 utilizes a generator neural network to combine latent codes such as a texture code and a structure code to generate a modified digital image. In some embodiments, the generator manager 1004 combines a structure code and a texture code in accordance with a scene layout map. For instance, the generator manager 1004 modifies a structure code to enforce semantic boundaries indicated by a scene layout map.

As further illustrated in FIG. 10, the deep image manipulation system 102 includes a scene layout map manager 1006. In particular, the scene layout map manager 1006 manages, extracts, maintains, generates, determines, receives, detects, retrieves, accesses, or identifies a scene layout map. In particular, the scene layout map manager 1006 generates a scene layout map from a reference digital image by utilizing a semantic segmentation neural network to determine boundaries associated with depicted digital content of different semantic labels. In addition, the scene layout map manager 1006 communicates with the generator manager 1004 to combine the scene layout map with extracted latent codes to generate a modified digital image that adheres to the semantic boundaries of the scene layout map.

Additionally, the deep image manipulation system 102 includes a parameter learning manager 1008. In particular, the parameter learning manager 1008 manages, maintains, extracts, learns, trains, tunes, determines, generates, or identifies parameters for a swapping autoencoder (e.g., the swapping autoencoder 112), including one or more neural networks such as an encoder neural network and a generator neural network. As described above, the parameter learning manager 1008 learns parameters by iteratively training the encoder neural network 306 and the generator neural network 318 utilizing discriminator neural networks and various loss functions. The parameter learning manager 1008 further learns parameters for a semantic segmentation neural network.

The deep image manipulation system 102 further includes a storage manager 1010. The storage manager 1010 operates in conjunction with or include one or more memory devices such as the database 1012 (e.g., the database 114) that store various data such as a repository of digital images and the neural networks described herein. The storage manager 1010 (e.g. via a non-transitory computer memory/one or more memory devices) stores and maintain data associated with extracting latent codes, generating or receiving scene layout maps, and generating modified digital images based on the extracted latent codes and the scene layout maps.

In one or more embodiments, each of the components of the deep image manipulation system 102 are in communication with one another using any suitable communication technologies. Additionally, the components of the deep image manipulation system 102 is in communication with one or more other devices including one or more client devices described above. It will be recognized that although the components of the deep image manipulation system 102 are shown to be separate in FIG. 10, any of the subcomponents may be combined into fewer components, such as into a single component, or divided into more components as may serve a particular implementation. Furthermore, although the components of FIG. 10 are described in connection with the deep image manipulation system 102, at least some of the components for performing operations in conjunction with the deep image manipulation system 102 described herein may be implemented on other devices within the environment.

The components of the deep image manipulation system 102 can include software, hardware, or both. For example, the components of the deep image manipulation system 102 can include one or more instructions stored on a computer-readable storage medium and executable by processors of one or more computing devices (e.g., the computing device 1000). When executed by the one or more processors, the computer-executable instructions of the deep image manipulation system 102 can cause the computing device 1000 to perform the methods described herein. Alternatively, the components of the deep image manipulation system 102 can comprise hardware, such as a special purpose processing device to perform a certain function or group of functions. Additionally, or alternatively, the components of the deep image manipulation system 102 can include a combination of computer-executable instructions and hardware.

Furthermore, the components of the deep image manipulation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the deep image manipulation system 102 may be implemented as part of a stand-alone application on a personal computing device or a mobile device. Alternatively, or additionally, the components of the deep image manipulation system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, and INDESIGN®. "ADOBE," "ADOBE EXPERIENCE MANAGER," "CREATIVE CLOUD," "ADOBE STOCK," "PHOTOSHOP," and "INDESIGN" are either registered trademarks or trademarks of Adobe Inc. in the United States and/or other countries.

FIGS. 1-10, the corresponding text, and the examples provide a number of different systems, methods, and non-transitory computer readable media for generating modified digital images utilizing a swapping autoencoder to incorporate a scene layout. In addition to the foregoing, embodiments can also be described in terms of flowcharts comprising acts for accomplishing a particular result. For example, FIGS. 11-12 illustrate flowcharts of example sequences or series of acts in accordance with one or more embodiments.

Figure 11:
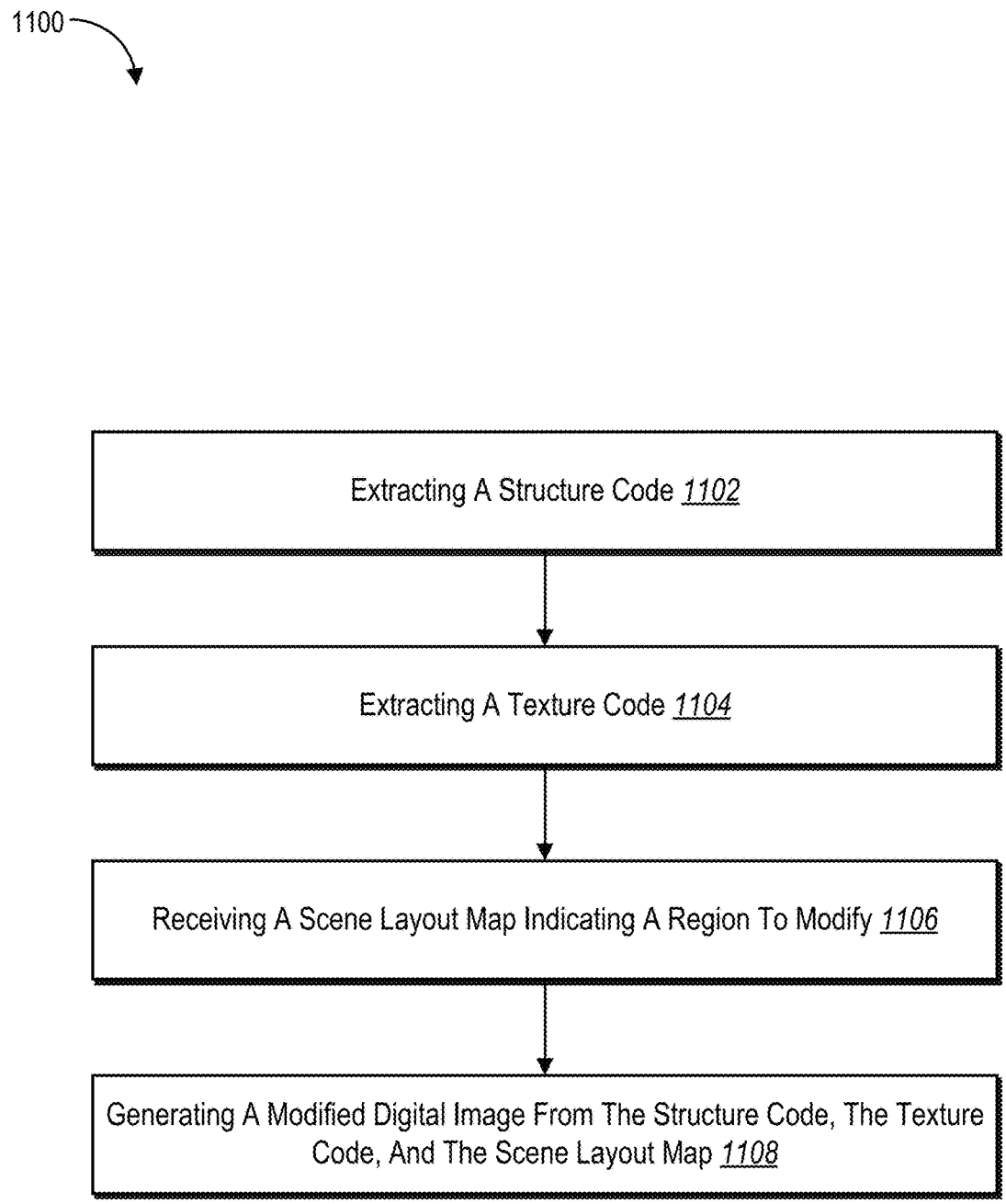
FIG. 11 illustrates a flowchart of a series of acts for generating modified digital images utilizing a swapping autoencoder to modify a digital image by adding new digital content indicated by a scene layout in accordance with one or more embodiments.
Figure 12:
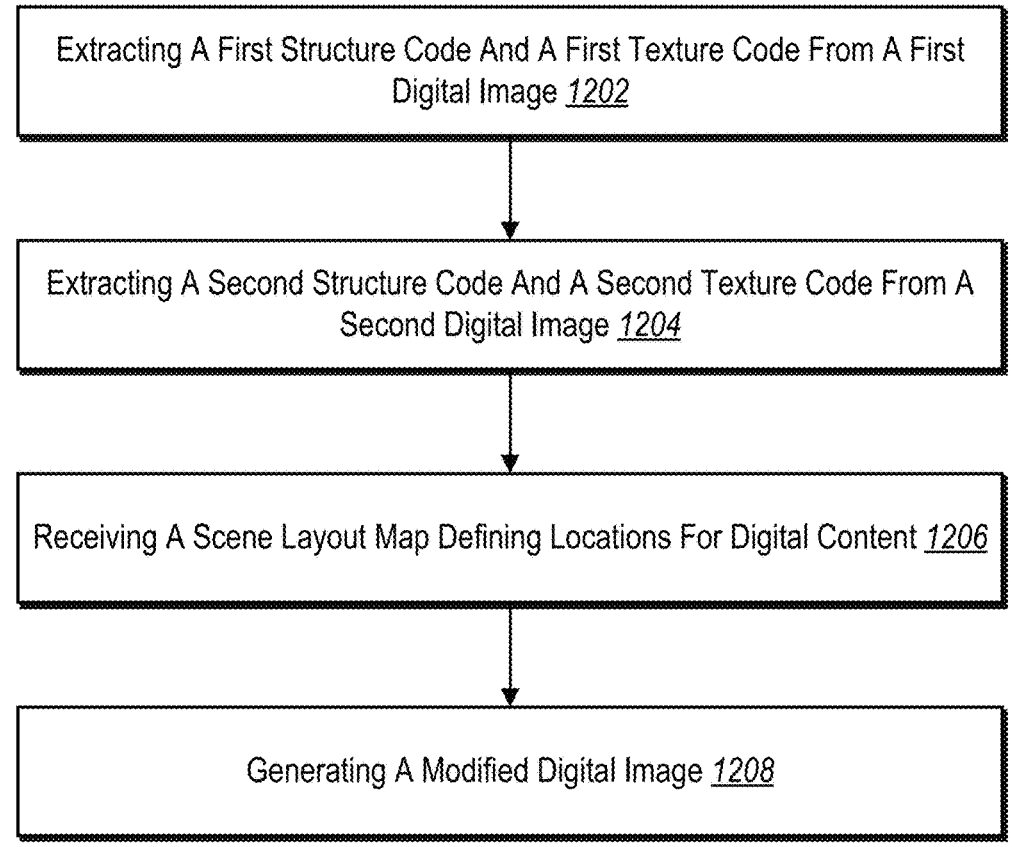
FIG. 12 illustrates a flowchart of a series of acts for generating modified digital images utilizing a swapping autoencoder to incorporate a scene layout in accordance with one or more embodiments.

While FIGS. 11-12 illustrate acts according to one embodiment, alternative embodiments may omit, add to, reorder, and/or modify any of the acts shown in FIGS. 11-12. The acts of FIGS. 11-12 can be performed as part of a method. Alternatively, a non-transitory computer readable medium can comprise instructions, that when executed by one or more processors, cause a computing device to perform the acts of FIGS. 11-12. In still further embodiments, a system can perform the acts of FIGS. 11-12. Additionally, the acts described herein may be repeated or performed in parallel with one another or in parallel with different instances of the same or other similar acts.

FIG. 11 illustrates an example series of acts 1100 of generating modified digital images utilizing a swapping autoencoder to modify a digital image by adding new digital content indicated by a scene layout. In particular, the series of acts 1100 includes an act 1102 of extracting a structure code. For example, the act 1102 involves extracting from one or more digital images, utilizing an encoder neural network, a structure code comprising features corresponding to a geometric structure of the one or more digital images.

In addition, the series of acts 1100 includes an act 1104 of extracting a texture code. In particular, the act 1104 involves extracting from the one or more digital images, utilizing the encoder neural network, a texture code comprising features corresponding to a textural appearance of the one or more digital images. In some embodiments, the series of acts 1100 includes acts of extracting the structure code from a certain digital image and extracting the texture code from the certain digital image.

As shown, the series of acts 1100 also includes an act 1106 of receiving a scene layout map indicating a region to modify. In particular, the act 1106 involves receiving a scene layout map indicating a region of the one or more digital images to be modified. For example, the act 1106 involves receiving labels for digital content depicted within digital images and further comprising boundaries for digital content of different labels.

As further shown, the series of acts 1100 includes an act 1108 of generating a modified digital image from the structure code, the texture code, and the scene layout map. In particular, the act 1108 involves generating a modified digital image by combining, utilizing a generator neural network, the structure code and the texture code in accordance with the scene layout map. For example, the act 1108 involves generating the modified digital image by combining the structure code and texture code to force digital content depicted within the one or more digital images to fit boundaries indicated by the scene layout map.

In some embodiments, the series of acts 1100 includes an act of determining, for one or more additional digital images, one or more average structure codes for portions of the one or more additional digital images corresponding to the region indicated by the scene layout map. In these or other embodiments, the series of acts 1100 includes an act of replacing a portion of the digital image corresponding to the region indicated by the scene layout map by replacing a portion of the structure code of the digital image corresponding to the region indicated by the scene layout map with an average structure code from among the one or more average structure codes.

In one or more embodiments, the series of acts 1100 includes an act of generate a plurality of clusters of structure codes for portions of a sample set of digital images corresponding to the region indicated by the scene layout map. Additionally (or alternatively), the series of acts 1100 includes an act of determining a representative structure code for a given cluster of the plurality of clusters. In the same or other embodiments, the series of acts 1100 includes an act of replacing a portion of the one or more digital images corresponding to the region indicated by the scene layout map by replacing a portion of the structure code corresponding to the region indicated by the scene layout map with the representative structure code.

In certain embodiments, the series of acts 1100 includes an act of learning parameters for the encoder neural network and the generator neural network by determining a reconstruction loss only for portions of the one or more digital images unrelated to the region indicated by the scene layout map.

FIG. 12 illustrates an example series of acts 1200 of generating modified digital images utilizing a swapping autoencoder to incorporate a scene layout. In particular, the series of acts 1200 includes an act 1202 of extracting a first structure code and a first texture code from a first digital image. For example, the act 1202 involves extracting from the first digital image, utilizing the encoder neural network, a first structure code comprising features corresponding to a geometric structure of the first digital image and a first texture code comprising features corresponding to a textural appearance of the first digital image.

Additionally, the series of acts 1200 includes an act 1204 of extracting a second structure code and a second texture code from a second digital image. In particular, the act 1204 involves extracting from the second digital image, utilizing the encoder neural network a second structure code comprising features corresponding to a geometric structure of the second digital image and a second texture code comprising features corresponding to a textural appearance of the second digital image.

As shown, the series of acts 1200 also includes an act 1206 of receiving a scene layout map defining locations for digital content. In particular, the act 1206 involves receiving a scene layout map defining locations for digital content depicted within the first digital image or the second digital image. For example, the act 1206 involves receiving the scene layout map by receiving boundaries for digital content of different labels depicted within the first digital image. In some embodiments, the act 1206 involves utilizing a semantic segmentation neural network to extract the scene layout map from a reference digital image. For instance, the act 1206 involves receiving user interaction to select a reference digital image and extracting the scene layout map from the reference digital image utilizing a semantic segmentation neural network.

Further, the series of acts 1200 includes an act 1208 of generating a modified digital image. In particular, the act 1208 involves generate, utilizing the generator neural network, a modified digital image comprising digital content of the first digital image and digital content of the second digital image arranged according to the scene layout map by combining: the first structure code and the second texture code in accordance with the scene layout map, or the first texture code and the second structure code in accordance with the scene layout map. For example, the act 1208 involves generating the modified digital image by combining the first structure code and the second texture code to force the digital content depicted within the first digital image to fit the boundaries indicated by the scene layout map. As another example, the act 1208 involves generate the modified digital image by combining the first texture code and the second structure code to force the digital content depicted within the second digital image to fit the boundaries indicated by the scene layout map. In some cases, the act 1208 involves modifying the first structure code using the scene layout map to replace one or more features of the first structure code with feature corresponding to the scene layout map. In these or other cases, the modified digital image depicts digital content corresponding to different labels fitted to different locations indicated by the scene layout map.

In some embodiments, the series of acts 1200 includes an act of learning parameters of the swapping autoencoder by: generating a first concatenated digital image by concatenating the first digital image with the scene layout map, generating a second concatenated digital image by concatenating the modified digital image with the scene layout map, and utilizing a discriminator neural network to compare the first concatenated digital image and the second concatenated digital image. In these or other embodiments, the series of acts 1200 includes an act of combining the scene layout map with the first structure code and the second texture code utilizing SPADE modulation at each upsampling layer of the generator neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
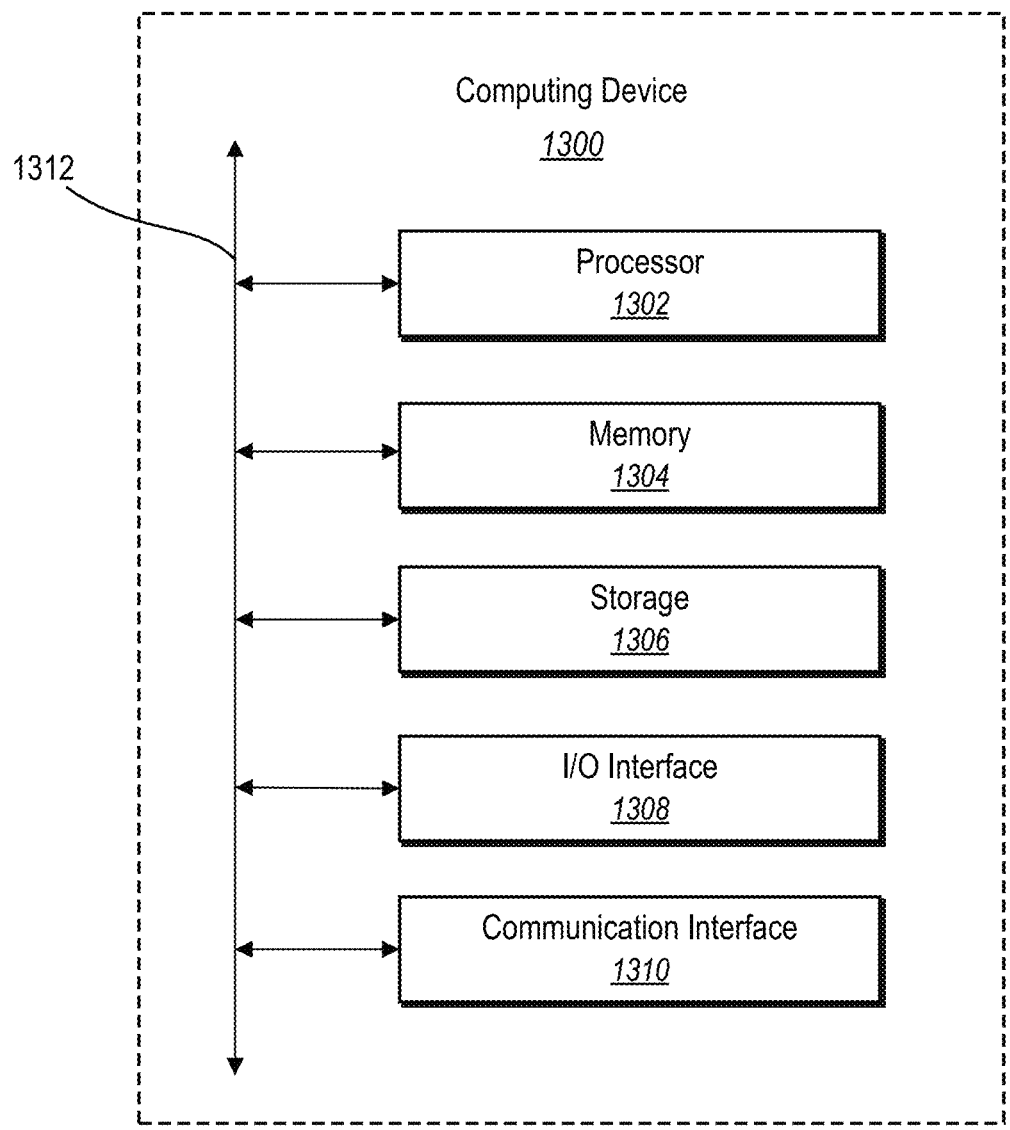
FIG. 13 illustrates a block diagram of an example computing device in accordance with one or more embodiments.

FIG. 13 illustrates, in block diagram form, an example computing device 1300 (e.g., the computing device 1000, the client device 108, and/or the server(s) 104) that may be configured to perform one or more of the processes described above. One will appreciate that the deep image manipulation system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   extracting a texture code from a digital image utilizing an encoder of a swapping autoencoder that includes the encoder and a generator neural network;
   extracting a structure code from the digital image utilizing the encoder of the swapping autoencoder;
   receiving a scene layout map defining semantic regions that indicate boundaries for semantically labeled image content and indicating content of a semantic label not present within the digital image; and
   generating, utilizing the generator neural network of the swapping autoencoder to combine the texture code and the structure code as guided by the scene layout map, a modified digital image by:
   arranging content of the digital image according to the boundaries for the semantically labeled image content from the scene layout map; and
   generating, utilizing the generator neural network, pixels depicting content of the semantic label not present within the digital image.

2. The method of claim 1, wherein receiving the scene layout map comprises receiving indications for boundaries between pixels depicting content of different semantic labels.

3. The method of claim 1, wherein receiving the scene layout map comprises receiving an indication for pixels depicting content of a semantic label not present within the digital image.

4. The method of claim 1, wherein generating the pixels depicting the content of the semantic label not present within the digital image comprises utilizing the generator neural network to replace a portion of the structure code with replacement structure code for the semantic label.

5. The method of claim 1, wherein generating the modified digital image comprises utilizing the generator neural network to modify the structure code by replacing a portion of the structure code with modified structure code corresponding to a semantic label introduced by the scene layout map and not present within the digital image.

6. The method of claim 5, wherein modifying the structure code comprises:
   generating an average-pooled structure code from a set of sample images depicting content corresponding to the semantic label introduced by the scene layout map; and
   replacing the portion of the structure code with the average-pooled structure code.

7. The method of claim 1, further comprising providing the modified digital image for display on a client device.

8. A system comprising:
   a memory component; and
   one or more processing devices coupled to the memory component, the one or more processing devices to perform operations comprising:
   extracting, utilizing an encoder of a swapping autoencoder that includes the encoder and a generator neural network, a texture code from a digital image, the texture code comprising features corresponding to a textural appearance of the digital image;
   extracting, utilizing the encoder of the swapping autoencoder, a structure code from the digital image, the structure code comprising features corresponding to a geometric structure of the digital image;
   receiving a scene layout map defining semantic regions that indicate boundaries for semantically labeled image content, the semantic regions including a semantic region of pixels not depicted in the digital image; and generating, utilizing a generator neural network and the scene layout map, a modified digital image by:
generating pixels depicting content from the digital image as defined by the texture code and the structure code and by arranging the pixels according to the semantic regions of the scene layout map; and
generating additional pixels depicting new content not in the digital image and corresponding to a semantic label indicated by the semantic region within the scene layout map.

9. The system of claim 8, wherein receiving the scene layout map comprises:
receiving indications for boundaries between pixels depicting content of different semantic labels; and
receiving an indication for pixels depicting content of a semantic label not present within the digital image.

10. The system of claim 8, wherein generating the modified digital image comprises:
generating a replacement structure code corresponding the semantic label of the semantic region different from pixels of the digital image by average pooling structure codes from a cluster of sample images depicting content corresponding to the semantic label of the semantic region; and
replacing a portion of the structure code of the digital image with the replacement structure code.

11. The system of claim 8, wherein generating the modified digital image comprises utilizing the generator neural network to generate, from the texture code and the structure code, pixels depicting content arranged according to the boundaries defined by the semantic regions of the scene layout map.

12. The system of claim 8, wherein receiving the scene layout map comprises receiving an indication of a user interaction defining the semantic label and a boundary for the semantic region of pixels different from pixels of the digital image.

13. The system of claim 8, wherein generating the modified digital image comprises utilizing the generator neural network to generate pixels for the semantic region different from the pixels of the digital image.

14. The system of claim 8, wherein the operations further comprise providing the modified digital image for display on a client device.

15. A non-transitory computer readable medium storing instructions which, when executed by a processing device, cause the processing device to perform operations comprising:
extracting a texture code from a digital image utilizing an encoder of a swapping autoencoder that includes the encoder and a generator neural network;
extracting a structure code from the digital image utilizing the encoder of the swapping autoencoder;
receiving a scene layout map defining semantic regions that indicate boundaries for semantically labeled image content and indicating content of a semantic label not present within the digital image; and
generating, utilizing the generator neural network of the swapping autoencoder to combine the texture code and the structure code as guided by the scene layout map, a modified digital image by:
arranging content of the digital image according to the boundaries for the semantically labeled image content from the scene layout map; and
generating, utilizing the generator neural network, pixels depicting content of the semantic label not present within the digital image.

16. The non-transitory computer readable medium of claim 15, wherein receiving the scene layout map comprises:
receiving indications for the boundaries between pixels depicting content of different semantic labels; and
receiving an indication for pixels depicting content of a semantic label not present within the digital image.

17. The non-transitory computer readable medium of claim 15, wherein generating the modified digital image comprises:
generating a replacement structure code corresponding a semantic label for pixels not depicted in the digital image by average pooling structure codes from a cluster of sample images depicting content corresponding to the semantic label; and
replacing a portion of the structure code of the digital image with the replacement structure code.

18. The non-transitory computer readable medium of claim 15, wherein generating the modified digital image comprises utilizing the generator neural network to generate, from the texture code and the structure code, pixels depicting content with boundaries defined by the semantic regions of the scene layout map.

19. The non-transitory computer readable medium of claim 15, wherein generating the modified digital image comprises utilizing the generator neural network to generate, from the texture code and the structure code, pixels depicting different types of content separated by the semantic regions of the scene layout map.

20. The non-transitory computer readable medium of claim 15, wherein the modified digital image depicts digital content corresponding to different labels fitted to different locations indicated by the scene layout map.

* * * * *